(12) United States Patent
Zhang et al.

(10) Patent No.: US 10,027,593 B2
(45) Date of Patent: Jul. 17, 2018

(54) METHODS FOR RE-ORDER PDCP PACKETS

(71) Applicant: MediaTek Singapore Pte. Ltd., Singapore (SG)

(72) Inventors: Yuanyuan Zhang, Beijing (CN); Per Johan Mikael Johansson, Kungsangen (SE); Chia-Chun Hsu, New Taipei (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 66 days.

(21) Appl. No.: 15/101,931

(22) PCT Filed: Jan. 28, 2015

(86) PCT No.: PCT/CN2015/071746
§ 371 (c)(1),
(2) Date: Jun. 6, 2016

(87) PCT Pub. No.: WO2015/113497
PCT Pub. Date: Aug. 6, 2015

(65) Prior Publication Data
US 2016/0315868 A1    Oct. 27, 2016

(30) Foreign Application Priority Data
Jan. 28, 2014    (CN) .......................... 2014 1 0042108

(51) Int. Cl.
*G01R 31/08*    (2006.01)
*H04L 12/801*    (2013.01)
(Continued)

(52) U.S. Cl.
CPC ............ *H04L 47/34* (2013.01); *H04L 1/1812* (2013.01); *H04L 1/1841* (2013.01); *H04L 47/624* (2013.01)

(58) Field of Classification Search
CPC ..... H04L 47/34; H04L 1/1841; H04L 1/1812; H04L 47/624
See application file for complete search history.

(56) References Cited

U.S. PATENT DOCUMENTS

2009/0103445 A1*   4/2009   Sammour ............. H04L 1/1812
                                                   370/252
2010/0034169 A1*   2/2010   Maheshwari ......... H04L 1/1874
                                                   370/331
(Continued)

FOREIGN PATENT DOCUMENTS

CN    101483505 A    7/2009
CN    101682864 A    3/2010
(Continued)

OTHER PUBLICATIONS

3rd Generation Partnership Project; Technical Specification Group Radio Access Network; Packet Data Convergence Protocol (PDCP) specification (Release 11), 3GPP TS 25.323 V11.0.0, Dec. 2012, pp. 1-43, XP050649149.
(Continued)

*Primary Examiner* — Robert Wilson
(74) *Attorney, Agent, or Firm* — Winston Hsu

(57) ABSTRACT

Apparatus and methods are provided to reorder PDCP SDUs. In one novel aspect, a timer-based PDCP reordering process is triggered upon detecting a PDCP gap existing condition, which indicates an SN gap between the PDCP SDUs of two parallel RLC entities larger than zero. The PDCP gap-closing condition is detected when the last-delivered SDU COUNT number plus one equals to the next-expected SDU COUNT number. In one embodiment, all the stored PDCP SDUs with consecutive COUNT numbers starting from the received SDU COUNT number are delivered upon detecting the PDCP gap-closing condition. In another novel aspect, a reordering timer is started upon
(Continued)

detecting the PDCP gap condition. In one embodiment, the expiration of the reordering timer triggers the delivery of SDUs to upper layers. In one embodiment, the UE is configured with dual connectivity and the reordering SDU COUNT numbers and the reordering timers are associated with different connectivity configured.

29 Claims, 14 Drawing Sheets

(51) Int. Cl.
*H04L 1/18* (2006.01)
*H04L 12/863* (2013.01)

(56) References Cited

U.S. PATENT DOCUMENTS

| | | | |
|---|---|---|---|
| 2012/0155438 A1 | 6/2012 | Shin | |
| 2012/0294281 A1* | 11/2012 | Park | H04L 1/1841 370/331 |
| 2013/0010688 A1* | 1/2013 | Yi | H04L 1/1829 370/328 |
| 2014/0301188 A1* | 10/2014 | Koskinen | H04L 47/32 370/230 |
| 2016/0241685 A1* | 8/2016 | Shah | H04L 69/04 |
| 2016/0315868 A1* | 10/2016 | Zhang | H04L 47/34 |

FOREIGN PATENT DOCUMENTS

| | | |
|---|---|---|
| CN | 101843138 A | 9/2010 |
| CN | 102377803 A | 3/2012 |
| CN | 102959892 A | 3/2013 |

OTHER PUBLICATIONS

"International Search Report" dated Apr. 21, 2015 for International application No. PCT/CN2015/071746, International filing date:Jan. 28, 2015.

* cited by examiner

METHODS FOR RE-ORDER PDCP PACKETS

CROSS REFERENCE TO RELATED APPLICATIONS

This application claims priority under 35 U.S.C. § 111(a) and is based on and hereby claims priority under 35 U.S.C. § 120 and § 365(c) from Chinese Application No. 201410042108.7, entitled "METHODS FOR RE-ORDER PDCP PACKETS" filed on Jan. 28, 2014. The subject matter of which is incorporated herein by reference.

TECHNICAL FIELD

The disclosed embodiments relate generally to wireless communication, and, more particularly, to Packet Data Convergence Protocol (PDCP) Service Data Units (SDUs) of Data Radio Bearers (DRBs) mapped on Radio Link Protocol (RLC) Unacknowledged Mode (UM)/Acknowledged Mode (AM) and deliver the PDCP SDUs to upper layers in ascending order.

BACKGROUND

The wireless communications industry has grown exponentially in recent years. Third generation partnership project (3GPP) and Long Term Evolution (LTE) mobile telecommunication systems provide high data rate, lower latency and improved system performances. Dual connectivity (DC) is to enhance the performance, where a given User Equipment (UE) uses radio resources provided by at least two different network points that are cooperating across either ideal or non-ideal backhaul. In addition, each Enhanced Node B (eNB) involved in dual connectivity for a UE may assume different roles, a Master eNB (MeNB) and/or a Supporting eNB (SeNB). One user plane architecture and protocol enhancement for dual connectivity is the combination of a) the whole user plane for a UE of the S1 reference point (S1-U) terminating in a Master eNB (MeNB); b) bearers may be split in MeNB and the UE, where packets of a single bearer is multiplexed onto two different radio links that are served by the two different network points; c) The PDCP protocol layer handles common user plane functions for multiplexing and de-multiplexing onto two different radio links; and d) The RLC protocol (below PDCP) runs independently for each radio link of the split bearer(s). The peer RLC entities on the UE side receive the split bearers independently.

A data radio bearer (DRB) or a bearer is a stream of data packets that are to be transferred across the wireless network without changing the order of packets and with certain specific Quality of Service (QoS) characteristics. In a 3GPP LTE access network, typically a specific bearer or DRB would be setup for such a stream of data packets, where different streams of packets can be discriminated based on TCP/IP level packet filters. A "split data radio bearer" or a "split DRB" is a bearer for which where packets are multiplexed onto two different radio links that are served by the two different network points.

In the LTE radio protocol stack, the PDCP layer is located above the RLC layer and below the IP layer in the user plane. If a PDCP entity is established for DRBs mapped to RLC UM, it is associated with two UM RLC entities, one for the uplink direction and one for the downlink direction. RLC UM is an operating mode optimized for delay-sensitive and error-tolerant real time applications, especially VoIP, and other delay-sensitive streaming services. Currently, reordering is performed in UM RLC to rearrange the processing order of RLC data PDUs in sequential order if they are received out of sequence due to the multiple Hybrid Automatic ReQuest repeat (HARQ) processes running in parallel with "stop and wait" operation. So in-order delivery of RLC SDUs to PDCP can be guaranteed except at re-establishment of RLC layer. Re-ordering for PDCP SDUs mapped to RLC UM is not needed in current LTE protocol stack.

If a PDCP entity is established for DRBs mapped on RLC AM, it is associates with AM RLC. The AM RLC is an operating mode optimized for error-sensitive and delay-tolerant non-real-time applications. Examples of such application include most of the interactive/background type services, such as web browsing and file downloading. Streaming-type services also frequently use AM RLC if the delay requirement is not too stringent. RRC message also uses the AM RLC in order to take advantage of ARQ to ensure reliability. Currently, reordering is performed in AM RLC to rearrange the processing order of RLC data PDUs in-sequence if they are received out of sequence due to the multiple HARQ processes running in parallel with "stop and wait" operation. So in-sequence delivery of RLC SDUs to PDCP can be guaranteed except at re-establishment of lower layers, which is not the case for dual connectivity.

For dual connectivity with bearer splitting at PDCP layer, PDCP protocol Sequence Numbers (SN) could be used to ensure in-order delivery of packets. Out of order sequence would be characterized by a "SN gap" between the PDCP SDUs of two parallel RLC bearers at the reception buffer, since each base station would deliver the data with different speed and usually out of order. The problem exists even without physical layer losses or fluctuation due to channel or loading conditions. The main cause of the problem is that the X2 flow control normally makes the MeNB sends RLC PDUs in batches to SeNB. So re-ordering at the PDCP layer is required for downlink (DL) data reception at the UE side to guarantee the in-order delivery of upper layer PDUs. Re-ordering method for PDCP SDUs of DRBs mapped on RLC UM is provided when dual connectivity is configured.

Further, due to the radio link degradation of SeNB, the UE cannot receive the data packets correctly, especially when suffering radio link failure. It is also possible that there is data loss when PDCP data PDUs are forwarded over the X2 interface between MeNB and SeNB. How to deal with the genuine loss over the Uu interface needs to be considered because the UE cannot differentiate whether the appearance of the "SN gap" is due to genuine data loss or out of delivery between the two eNBs. Re-ordering methods for PDCP SDUs of DRBs mapped on RLC AM are provided when dual connectivity is configured.

Improvements and enhancements are required for reordering PDCP packets in a dual connectivity system.

SUMMARY OF THE INVENTION

Apparatus and methods are provided for PDCP data reordering and delivering the PDCP SDUs to upper layers in ascending order. In one novel aspect, a PDCP reordering process is triggered upon detecting a PDCP gap existing condition, which indicates SN gap between the PDCP SDUs of two parallel RLC entities at a reception buffer of the UE is larger than zero. In one embodiment, the PDCP gap existing condition is detected when there is at least one SDU stored. The SDU is stored when the UE detects that the last-delivered SDU COUNT number plus one is smaller than the next-expected SDU COUNT number. In one embodiment, all the stored PDCP SDUs with consecutive COUNT numbers starting from the received SDU COUNT number are delivered to upper layers upon detecting the PDCP gap-closing condition. In another embodiment, the reordering process involves storing corresponding received SDUs and Setting a next-expected SDU COUNT number to be equal to the COUNT number of the SDU following the SDU with largest SDU COUNT value. In yet another embodiment, the reordering process further sets a reordering SDU COUNT number to be equal to the next-expected SDU COUNT number.

In another novel aspect, a reordering timer is started upon detecting a PDCP gap existing condition that indicates SN gap between the PDCP SDUs of two parallel RLC entities at a reception buffer of the UE. In one embodiment, the expiration of the reordering timer is a delivery-triggering event that triggers the delivery of SDUs in ascending order to upper layers. In yet another embodiment, the reordering timer is associated with a next-expected SDU COUNT number when the reordering timer is started. In one embodiment, the UE is configured with dual connectivity. The above methods could applied both to AM RLC and UM RLC.

Other embodiments and advantages are described in the detailed description below. This summary does not purport to define the invention. The invention is defined by the claims.

BRIEF DESCRIPTION OF DRAWINGS

The accompanying drawings, where like numerals indicate like components, illustrate embodiments of the invention.

DETAILED DESCRIPTION

Figure 1:
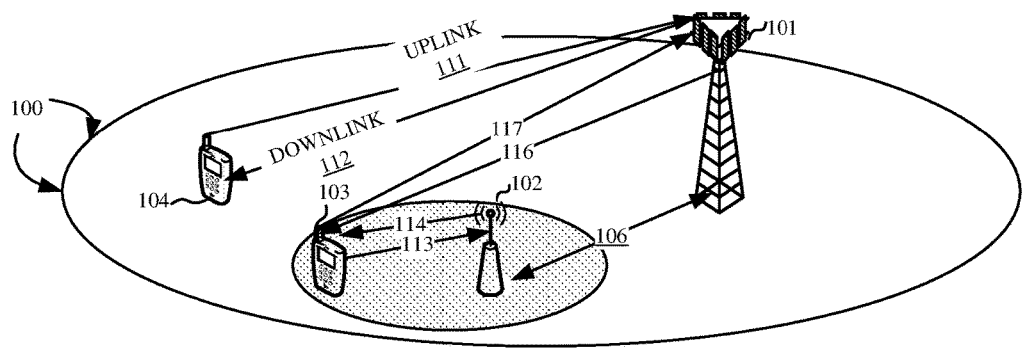
FIG. 1 illustrates an exemplary wireless communication system in accordance with embodiments of the invention.

Reference will now be made in detail to some embodiments of the invention, examples of which are illustrated in the accompanying drawings.

In one novel aspect, a method for a mobile station to re-orders PDCP SDUs of split radio bear(RB) comprising: receiving PDCP data PDU from lower layers; storing a PDCP SDU; updating the state variables and deliver to upper layer the PDCP SDUs if the earliest PDCP SDU that is considered for reordering is received and stored; starting or stopping the re-ordering timer depends on whether "SN gaps" still exist; updating the state variables and deliver to upper layer the PDCP SDUs if the re-ordering timer expires. The above method could be applied to AM or UM RLC.

In addition to using plain PDCP SN for reordering, in a 3GPP system there is a possibility to use COUNT numbers for reordering. Each PDCP SDU is associated with a COUNT value. The least significant bits of COUNT are the same as the PDCP SN, which is transferred with SDUs by the protocol. The most significant bits of COUNT are called hyper frame number (HFN). HFN is not transferred by the protocol but is incremented every time PDCP SN wraps around. For most reordering functionality, SN and COUNT may be applied interchangeably.

In one embodiment, a method for updating the state variables and deliver to upper layer to the PDCP SDUs further comprising: checking whether the received and stored PDCP SDU is the earliest PDCP SDU that is considered for reordering; updating the state variable related to the earliest PDCP SDU that is considered for reordering for both SN and HFN to remember the next earliest PDCP SDU which has not been received; deliver to upper layer in ascending order of the associated COUNT value all stored PDCP SDU(s) less than the COUNT value corresponding to the next earliest PDCP SDU which has not been received; and updating the state variable indicating the SN of the last PDCP SDU delivered to the upper layers.

In one embodiment, a method of controlling the reordering timer further comprising: if the reordering timer is running, checking whether the SN gap which triggered the reordering timer has been closed; if the SN gap is closed, stop and reset the reordering timer; otherwise, keeping the timer running as it is; if the reordering timer is not running, checking whether there is any "SN gap" existing and starting the timer if it is the case, and holding the value of the COUNT following the COUNT of the PDCP SDU which triggered the reordering timer.

In one embodiment, a method for updating the state variables and deliver to upper layer to the PDCP SDUs upon the expiration of the reordering timer further comprising: updating the state variable related to the earliest PDCP SDU that is considered for reordering to holds the value of the COUNT following the COUNT of the PDCP SDU which triggered the reordering timer; deliver to upper layer in ascending order of the associated COUNT value: all stored PDCP SDU(s) with an associated COUNT less than the COUNT value corresponding to the next earliest PDCP SDU which has not been received; if there is still "SN gap" existing, start the reordering timer and holding the value of the COUNT following the COUNT of the PDCP SDU which triggered the reordering timer.

In one embodiment of the disclosure, a method for a mobile station to process PDCP SDUs of split RBs comprising: receiving PDCP data PDU(s) from lower layers; storing PDCP SDU(s); delivering to upper layers the stored PDCP SDU(s) in ascending order of the associated COUNT value.

In one embodiment, a method for a mobile station to store a PDCP SDU further comprising: discard the PDCP SDU if a PDCP SDU with the same SN has been stored; otherwise, store the PDCP SDU. In another embodiment, a method for a UE to deliver to upper layers the stored PDCP SDU(s) comprising: checking whether the received PDCP SDU is the one following the last PDCP SDU delivered to the upper layer; delivering all stored PDCP SDU(s) with consecutively associated COUNT value(s) starting from the COUNT value associated with the received PDCP SDU; and updating the state variable indicating the SN of the PDCP SDU following the last PDCP SDU delivered to the upper layers. In another embodiment, a method for the mobile station to process PDCP SDUs of split RBs further comprising: sending a PDCP Status Report.

In one embodiment, PDCP uses reordering capability of lower layers. It is assumed that lower layer implements reordering queue, reordering timers and other possible mechanisms to ensure in-order delivery for each radio link separately. It is then assumed that if the lower layer has delivered a PDU with a certain SN or COUNT value it has then "given up" waiting for PDUs with lower SN or COUNT values. Furthermore, the lower layers may know about PDUs for which transmission has been attempted but failed, e.g. if the lower layer implements a discard function. Lower layers may also indicate that it has finished processing a PDU by indicating to PDCP that it is considered lost, whereby PDCP may also consider this PDU lost.

FIG. 1 illustrates an exemplary wireless communication system 100 in accordance with embodiments of the invention. Wireless communication system 100 includes one or more fixed base infrastructure units forming a network distributed over a geographical region. The base unit may also be referred to as an access point, an access terminal, a base station, a Node-B, eNode-B, or by other terminology used in the art. Base stations 101 and 102 serve a number of mobile stations 103 and 104 within a serving area, for example, a cell, or within a cell sector. In some systems, one or more base stations are coupled to a controller forming an access network that is communicably coupled to one or more core networks. The disclosure, however, is not intended to be limited to any particular wireless communication system.

Serving base station 101 and 102 transmit downlink communication signals 112 114 and 116 to the mobile station in the time and/or frequency domain. UE or Mobile station 103 and 104 communicate with one or more base units 101 and 102 via uplink communication signals 111 113 and 117. UE or the mobile station may also be referred to a mobile phone, laptop, and mobile workstation and so on. In one embodiment, wireless communication network 100 is an OFDM/OFDMA system comprising a base station eNB 101 eNB 102 and a plurality of mobile station 103 and mobile station 104. Dual connectivity is supported by the wireless network 100. Mobile station 103 is served by both base station eNB 101 and eNB 102, which are interconnected with each other by means of the X2 interface, i.e. interface 106. From the perspective of mobile station 103, the base station eNB 101 is considered as Macro eNB, which has relatively larger coverage. The base station eNB 102 is considered as Secondary eNB, which has a smaller coverage and provides additional radio resources to the UE.

Figure 2:
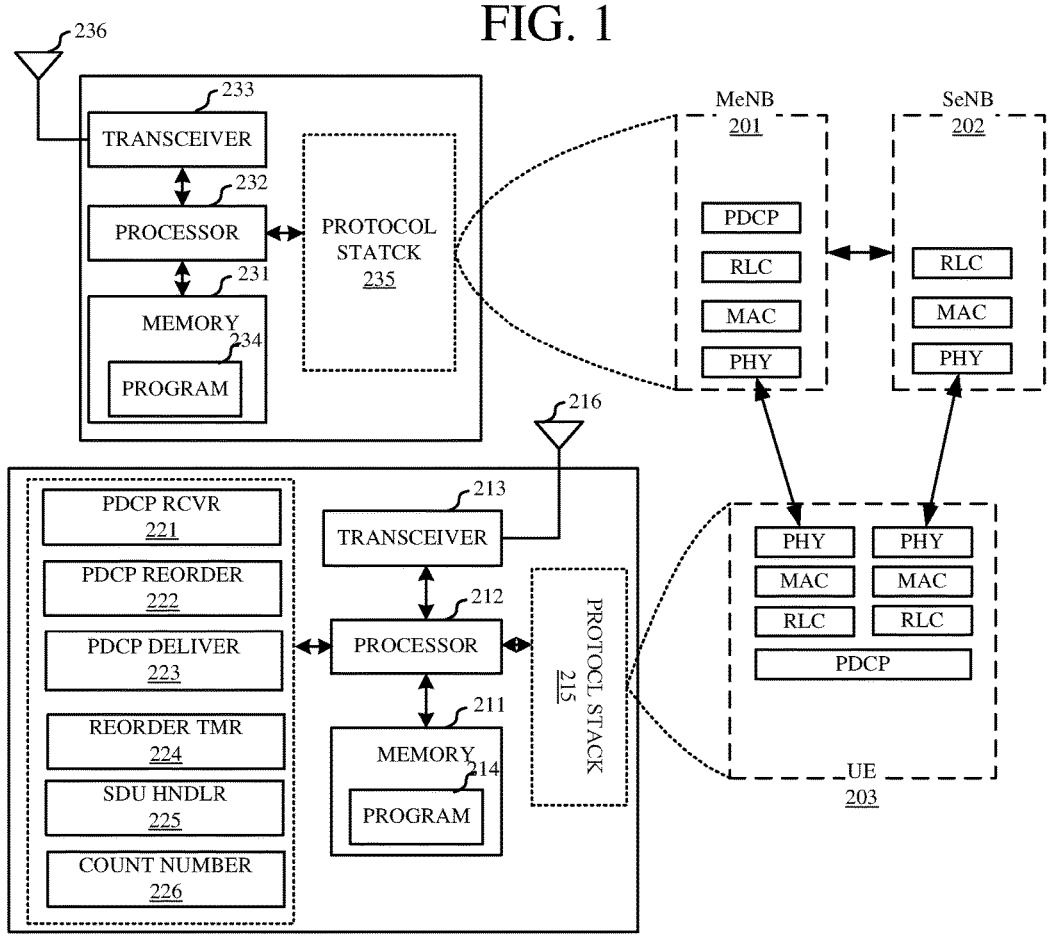
FIG. 2 shows exemplary block diagrams illustrating protocol stacks of the MeNB, the SeNB and the UE.

FIG. 2 shows exemplary block diagrams illustrating protocol stacks of the MeNB, the SeNB and the UE. MeNB 201 has a physical layer (PHY), Mac layer (MAC), Radio Link Control (RLC), and Packet Data Control Protocol (PDCP); SeNB 202 has a PHY, MAC and RLC. The interface between MeNB and SeNB is the X2 interface. The peer protocol stacks terminated in UE 203 include PHY, MAC, RLC and PDCP. PHY, MAC, RLC, and PDCP terminated in UE 203 are the peer protocol stacks of the ones terminated in seNB 202. PHY, MAC, and RLC terminated in UE 203 are the peer protocol stacks of the ones terminated in MeNB 201. The UE 203 and the MeNB 201 communicates directly by a Radio Link. UE 203 and SeNB 202 communicate directly by another Radio Link. FIG. 2 further shows exemplary block diagrams of UE 203 and MeNB 201 that supports some embodiments of the present invention.

UE 203 has RF transceiver 213, coupled with antenna 216 receives RF signals from antenna 216, converts them to baseband signals and sends them to processor 212. RF transceiver 213 also converts received baseband signals from the processor 212, converts them to RF signals, and sends out to antenna 216. Processor 212 processes the received baseband signals and invokes different functional modules to perform features in UE 203. Memory 211 stores program instructions and data 214 to control the operations of UE 203. FIG. 2 further illustrates exemplary functional modules of UE 203 including a PDCP receiver 221, a PDCP reordering handler 222, a PDCP delivery module 223, a reordering timer 224, an SDU handler 225 and a count number handler 226. PDCP receiver 221 receives one or more PDCP protocol data units (PDUs) from lower layers. PDCP reordering module 222 performs a timer-based PDCP reordering process upon detecting a PDCP gap condition. PDCP delivery module 223 that delivers a set of PDCP service data units (SDUs), each with a COUNT number representing a sequence number of the SDU, to upper layers based on one or more delivery criteria upon detecting one or more delivery triggering events. Reordering timer 224 starts a reordering timer when detecting the PDCP gap existing condition and detecting no reordering timer running. SDU handler 225 stores corresponding received SDUs. COUNT number handler 226 sets the next-expected SDU COUNT number to be equal to the largest SDU COUNT number received.

MeNB 201 has RF transceiver 233, coupled with antenna 236 receives RF signals from antenna 236, converts them to baseband signals and sends them to processor 232. RF transceiver 233 also converts received baseband signals from the processor 232, converts them to RF signals, and sends out to antenna 236. Processor 232 processes the received baseband signals and invokes different functional modules to perform features in MeNB 201. Memory 231 stores program instructions and data 234 to control the operations of MeNB 201. A protocol stack 235 performs enhanced protocol stack task in accordance to embodiments of the current invention. It is understood by one with ordinary skill in the art the similar structures applies to SeNB 202, where the protocol stack for the split bearers is different from the MeNB. The protocol stack differences between MeNB 201 and SeNB 202 are illustrated in FIG. 2 as well.

In one embodiment, the communication system utilize PDCP layer to perform header compression and decompression for IP packets, ciphering and deciphering for user plane and control plane data, and integrity protection and verification for control plane data, and in-sequence delivery of upper layer PDUs at re-establishment of lower layers. Exemplary of PDCP layer includes the developing Long Term Evolution (LTE) of the 3GPP UMTS standard.

In one embodiment, a method for a mobile station to process PDCP SDUs of split RBs comprising: receiving PDCP data PDU(s) from lower layers; storing PDCP SDU(s); delivering to upper layers the stored PDCP SDU(s) in ascending order of the associated COUNT value. In another embodiment, a method for a mobile station to process PDCPs of split RBs further comprises updating the state variable indicating the SN of the PDCP SDU following the last PDCP SDU delivered to the upper layers.

In one embodiment, a method for a mobile station to store a PDCP SDU further comprises discard the PDCP SDU if a PDCP SDU with the same SN has been stored; otherwise, store the PDCP SDU. In another method for a mobile station to delivering to upper layers the stored PDCP SDU(s) in ascending order of the associated COUNT value further comprising: checking whether the received PDCP SDU is the one following the last PDCP SDU delivered to the upper layer; delivering all stored PDCP SDU(s) with consecutively associated COUNT value(s) starting from the COUNT value associated with the received PDCP SDU. In yet another embodiment, a method for a mobile station to delivering to upper layers the stored PDCP SDU(s) in ascending order of the associated COUNT value further comprising: checking whether a reordering timer expires; delivering to upper layers all stored PDCP SDU(s) in ascending order of the associated COUNT value.

In one embodiment, a method for a mobile station to control the reordering timer further comprising: if the reordering timer is running, checking whether all the "SN gaps" are closed; if all the SN gaps are closed, stop and reset the reordering timer; otherwise, keeping the timer running as it is; if the reordering timer is not running, checking whether there is any "SN gap" existing and starting the timer if "SN gap" exists.

In one embodiment, a method for a mobile station to check whether there is "SN gap" existing further comprising: checking whether the COUNT value following the COUNT of the last PDCP SDU delivered to the upper layers is less than the COUNT value of the next expected PDCP SDU; SN gap is considered as existing if that is the case.

In one embodiment, a method for a mobile station to check whether all "SN gaps" are closed further comprising: checking whether the COUNT value following the COUNT of the last PDCP SDU delivered to the upper layers equal to the COUNT value of the next expected PDCP SDU; all SN gaps are considered as closed if that is the case.

In one embodiment, a method for a mobile station to delivering to upper layers the stored PDCP SDU(s) in ascending order of the associated COUNT value further comprising: checking whether a reordering timer expires; delivering to upper layers parts of the stored PDCP SDU(s) in ascending order of the associated COUNT value.

In one embodiment, a method for a mobile station to control the reordering timer further comprising: if the reordering timer is running, checking whether the SN gap which triggered the reordering timer has been closed; if the SN gap is closed, stop and reset the reordering timer; otherwise, keeping the timer running as it is; if the reordering timer is not running, checking whether there is any "SN gap" existing and starting the timer if it is the case, and holding the value of the COUNT following the COUNT of the PDCP SDU which triggered the reordering timer.

In one embodiment, a method for a mobile station to deliver to upper layers parts of the stored PDCP SDUs upon the expiration of the reordering timer further comprising: delivering to upper layer all stored PDCP SDU(s) with an associated COUNT no larger than the COUNT of the PDCP SDU which triggered the reordering timer; if there is still "SN gap" existing, starting the reordering timer and holding the value of the COUNT following the COUNT of the PDCP SDU which triggered the reordering timer.

In one embodiment, the PDCP SDU triggering the reordering timer is the last PDCP SDU received from lower layers, the COUNT value of which is larger than the COUNT value of the last PDCP SDU delivered to the upper layers. The COUNT following the COUNT of the PDCP SDU, which triggered the reordering timer, is the COUNT for the next expected PDCP SDU.

In one embodiment, a method for a mobile station to check whether there is "SN gap" existing further comprising: checking whether the COUNT value following the COUNT of the last PDCP SDU delivered to the upper layers is less than the COUNT value of the next expected PDCP SDU; SN gap is considered as existing if that is the case.

In one embodiment, a method for a mobile station to check whether a "SN gap" is closed further comprising: checking whether the COUNT value of the last PDCP SDU delivered to the upper layers is larger than the COUNT value of the PDCP SDU which triggered the reordering timer; the SN gap is considered as closed if that is the case.

In one embodiment, a method for a mobile station to delivering to upper layers the stored PDCP SDU(s) in ascending order of the associated COUNT value further comprising: starting a reordering timer upon the occurrence of each "SN gap", and holding the value of the COUNT following the COUNT of the PDCP SDU which triggered the reordering timer. So there may be multiple re-ordering timers are running simultaneously, with each corresponding to an SN gap.

In one embodiment, a method for a mobile station to control each of the reordering timers further comprising: if the reordering timer is running, checking whether the SN gap which triggered the reordering timer has been closed; if the SN gap is closed, stop and reset the reordering timer; otherwise, keeping the timer running as it is.

In one embodiment, a method for a mobile station to deliver to upper layers parts of the stored PDCP SDUs upon the expiration of each reordering timer further comprises delivering to upper layers all stored PDCP SDU(s) with associated COUNT values no larger than the COUNT of the PDCP SDU, which triggered the reordering timer.

In one embodiment, the PDCP SDU triggering the reordering timer is the PDCP SDU received from lower layers, the COUNT value of which is larger than the COUNT value of the next expected PDCP SDU, which has not been updated.

In one embodiment, a method for a mobile station to check whether a new "SN gap" appears further comprising: checking whether the COUNT value of the received PDCP SDU is larger than the COUNT value of the next expected PDCP SDU, which has not updated; a new SN gap is considered as appearing if that is the case.

In one embodiment, a method for a mobile station to delivering to upper layers the stored PDCP SDU(s) in ascending order of the associated COUNT value further comprising: receiving an indication from lower layers; delivering to upper layers all the stored PDCP SDU(s) in ascending order of the associated COUNT value. In another embodiment, the indication is generated from RLC indicating that RLC stops waiting for the out-of-order PDCP data PDUs.

In one embodiment of the disclosure, a method for a mobile station to process PDCP SDUs of split RBs comprising: receiving PDCP data PDU(s) from lower layers; storing PDCP SDU(s); delivering to upper layers the stored PDCP SDU(s) in ascending order of the associated COUNT value.

In one embodiment, a method for a mobile station to store a PDCP SDU further comprises discard the PDCP SDU if a PDCP SDU with the same SN has been stored; otherwise, store the PDCP SDU.

In one embodiment, a method for a UE to deliver to upper layers the stored PDCP SDU(s) comprising: checking whether the received PDCP SDU is the one following the last PDCP SDU delivered to the upper layer; delivering all stored PDCP SDU(s) with consecutively associated COUNT value(s) starting from the COUNT value associated with the received PDCP SDU; and updating the state variable indicating the SN of the PDCP SDU following the last PDCP SDU delivered to the upper layers.

In one embodiment, a method for the mobile station to process PDCP SDUs of split RBs further comprises sending a PDCP Status Report.

In one embodiment, a method for the mobile station to send the PDCP status report further comprises compiling a PDCP status report; and submitting it to lower layers associated with the macro cell group (MCG).

In one embodiment, a method for the mobile station to send the PDCP status report further comprising: updating the state variable related to the first PDCP SDU which is not received but not reported as missing; checking whether a reordering timer expires; compiling the PDCP status report if this is the case.

In one embodiment, a method for the mobile station to update the state variable related to the first PDCP SDU which is not received but not reported as missing further comprising: updating the state variables to the COUNT value of the first PDCP SDU, which has not been received and with COUNT value larger than the COUNT value of current state variables, if the PDCP SDU with COUNT value equal to the COUNT value of current state variables is received.

In one embodiment, a method for the mobile station to controlling the re-ordering timer further comprising: if the reordering timer is running, checking whether the SN gap which triggered the reordering timer has been closed; if the SN gap is closed, stop and reset the reordering timer; otherwise, keeping the timer running as it is; if the reordering timer is not running, checking whether there is any "SN gap" existing and starting the timer if it is the case, and holding the value of the COUNT following the COUNT of the PDCP SDU which triggered the reordering timer.

In one embodiment, the PDCP SDU triggering the reordering timer is the last PDCP SDU received from lower layers, the COUNT value of which is larger than the COUNT value of the last PDCP SDU delivered to the upper layers. The COUNT following the COUNT of the PDCP SDU, which triggered the reordering timer, is the COUNT for the next expected PDCP SDU.

In one embodiment, a method for a mobile station to check whether there is "SN gap" existing further comprising: checking whether the COUNT value following the COUNT of the last PDCP SDU delivered to the upper layers is less than the COUNT value of the next expected PDCP SDU; SN gap is considered as existing if that is the case.

In one embodiment, a method for a mobile station to check whether a "SN gap" is closed further comprising: checking whether the COUNT value of the last PDCP SDU delivered to the upper layers is no less than the COUNT value of the PDCP SDU which triggered the reordering timer; the SN gap is considered as closed if that is the case.

In one embodiment, a method for the mobile station to send the PDCP status report upon the expiration of the reordering timer further comprising: updating the state variable related to the first PDCP SDU which is not received but not reported as missing, whose COUNT value equal to or larger than the one following the COUNT of the PDCP SDU which triggered the reordering timer; checking whether there is any "SN gap" existing following the first PDCP SDU which is not received but not reported as missing; if that is the case, starting the timer and holding the value of the COUNT following the COUNT of the PDCP SDU which triggered the reordering timer.

In one embodiment, a method for the mobile station to whether there is "SN gap" existing following the first PDCP SDU which is not received but not reported as missing further comprising: checking whether the COUNT value of the first PDCP SDU which is not received but not reported as missing is less than the COUNT value of the next expected PDCP SDU; SN gap is considered as existing if that is the case. In another embodiment, a method of compiling a STATUS report further comprising: setting an FNR field to the PDCP SN of the first not received PDCP SDU but not reported as missing. In yet another embodiment, the field FNR is a new field, and contains current PDCP SN (after updating) of the first not received PDCP SDU, which is not reported as missing. The length of the field is equal to the length of PDCP SN space.

When the transmitting side of an PDCP entity receives a STATUS report, it will interprets that all PDCP data PDUs up to but not include the PDCP SDU with SN=FNR have been received by its peer PDCP entity, excluding those PDCP SDUs indicated in the STATUS report with SN equal to first missing SDU(FMS) and with SN corresponding to the bit position in the bitmap set to zero.

In the following example of the embodiment, the state variables needed for reordering are defined, which comprising: HFN and SN for the PDCP SDU with the value of the COUNT following the COUNT of the PDCP SDU which triggered the reordering timer, denoted as Reordering_PDCP_HFN and Reordering_PDCP_SN, respectively. The corresponding COUNT value is composed of Reordering_PDCP_HFN and Reordering_PDCP_SN. HFN and SN for the next expected PDCP SDU, denoted as NEXT_RX_HFN and NEXT_RX_SN respectively; and the corresponding COUNT value is composed of NEXT_RX_SN and NEXT_RX_HFN. HFN and SN for the last PDCP SDU delivered to the upper layers, denoted as Last_Submitted_PDCP_RX_SN and Last_Submitted_PDCP_HFN.

The procedure referred from current specification below should be performed firstly before each of the examples. One example (Example 1) is described below in accordance with embodiments of the current invention.

For split RBs, at reception of a PDCP Data PDU from lower layers, the UE shall:
  if (received PDCP SN−Last_Submitted_PDCP_RX_SN>Reordering_Window OR 0<=Last_Submitted_PDCP_RX_SN−received PDCP SN<Reordering_Window)
  if received PDCP SN>Next_PDCP_RX_SN:
  decipher the PDCP PDU, using COUNT based on RX_HFN−1 and the received PDCP SN;
  else:
  decipher the PDCP PDU, using COUNT based on RX_HFN and the received PDCP SN;
  perform header decompression (if configured)
  discard this PDCP SDU;
  else if Next_PDCP_RX_SN−received PDCP SN>Reordering_Window:
  increment RX_HFN by one;
  use COUNT based on RX_HFN and the received PDCP SN for deciphering the PDCP PDU;
  Next_PDCP_RX_SN=the received PDCP SN+1;
  else if received PDCP SN−Next_PDCP_RX_SN>=Reordering_Window:
  use COUNT based on RX_HFN−1 and the received PDCP SN for deciphering the PDCP PDU;
  else if received PDCP SN>=Next_PDCP_RX_SN:
  If received PDCP SN>Next_PDCP_RX_SN:
  set Old_Next_PDCP_RX_SN to Next_PDCP_RX_SN;
  set Old_Rx_HFN to RX_HFN;
  These two steps for Example 1.
  use COUNT based on RX_HFN and the received PDCP SN for deciphering the PDCP PDU;
  set Next_PDCP_RX_SN to the received PDCP SN+1;
  if Next_PDCP_RX_SN>Maximum_PDCP_SN:
  set Next_PDCP_RX_SN to 0;
  increment RX_HFN by one;
  else if received PDCP SN<Next_PDCP_RX_SN:
  use COUNT based on RX_HFN and the received PDCP SN for deciphering the PDCP PDU;

if the PDCP PDU has not been discarded in the above:
  perform deciphering and header decompression (if configured) for the PDCP PDU;
  if a PDCP SDU with the same PDCP SN is stored:
  discard this PDCP SDU;
  else:
  store the PDCP SDU;

One example (Example 2) is described below in accordance with embodiments of the current invention.
if received PDCP SN=Last_Submitted_PDCP_RX_SN+1 or received PDCP SN=Last_Submitted_PDCP_RX_SN−Maximum_PDCP_SN:
  deliver to upper layers in ascending order of the associated COUNT value:
  all stored PDCP SDU(s) with consecutively associated COUNT value(s) starting from the COUNT value associated with the stored PDCP SDU;
  set Last_Submitted_PDCP_RX_SN to the PDCP SN of the last PDCP SDU delivered to upper layers;
  set Last_Submitted_PDCP_HFN to the PDCP SN of the last PDCP SDU delivered to upper layers;
  if Last_Submitted_PDCP_RX_SN+1 is larger than Maximum_PDCP_SN:
  set Last_Submitted_PDCP_RX_SN+1 to 0;
  use COUNT corresponding to Last_Submitted_PDCP_RX_SN+1 based on Last_Submitted_PDCP_HFN+1 and SN=0;
if t-reordering-PDCP is running:
  If COUNT corresponding to Reordering_PDCP_SN=COUNT corresponding to Last_Submitted_PDCP_RX_SN+1;
  stop and reset t-reordering-PDCP;
if t-reordering-PDCP is not running:
  If COUNT corresponding to Next_PDCP_RX_SN>COUNT corresponding to Last_Submitted_PDCP_RX_SN+1;
  start t-reordering-PDCP;
When t-reordering-PDCP expires:
  deliver to upper layers in ascending order of the associated COUNT value:
  all stored PDCP SDU(s) with an associated COUNT value less than the COUNT value corresponding to Next_PDCP_RX_SN;
  set Last_Submitted_PDCP_RX_SN to the PDCP SN of the last PDCP SDU delivered to upper layers.

One example (Example 3) is described below in accordance with embodiments of the current invention.
if received PDCP SN=Last_Submitted_PDCP_RX_SN+1 or received PDCP SN=Last_Submitted_PDCP_RX_SN−Maximum_PDCP_SN:
  deliver to upper layers in ascending order of the associated COUNT value:
  all stored PDCP SDU(s) with consecutively associated COUNT value(s) starting from the COUNT value associated with the stored PDCP SDU;
  set Last_Submitted_PDCP_RX_SN to the PDCP SN of the last PDCP SDU delivered to upper layers;
  set Last_Submitted_PDCP_HFN to the PDCP SN of the last PDCP SDU delivered to upper layers;
  if Last_Submitted_PDCP_RX_SN+1 is larger than Maximum_PDCP_SN:
  set Last_Submitted_PDCP_RX_SN+1 to 0;
  use COUNT corresponding to Last_Submitted_PDCP_RX_SN+1 based on Last_Submitted_PDCP_HFN+1 and SN=0;

if t-reordering-PDCP is running:
  If COUNT corresponding to Reordering_PDCP_SN<=COUNT corresponding to Last_Submitted_PDCP_RX_SN+1;
    stop and reset t-reordering-PDCP;
  if t-reordering-PDCP is not running:
    If COUNT corresponding to Next_PDCP_RX_SN>COUNT corresponding to Last_Submitted_PDCP_RX_SN+1;
      start t-reordering-PDCP;
      set Reordering_PDCP_SN to Next_PDCP_RX_SN, and set Reordering_PDCP_HFN to RX_HFN;
  When t-reordering-PDCP expires,
    deliver to upper layers in ascending order of the associated COUNT value:
      all stored PDCP SDU(s) with an associated COUNT value less than the COUNT value corresponding to Reordering_PDCP_SN;
      set Last_Submitted_PDCP_RX_SN to the PDCP SN of the last PDCP SDU delivered to upper layers.
    If COUNT corresponding to Next_PDCP_RX_SN>COUNT corresponding to Last_Submitted_PDCP_RX_SN+1;
      start t-reordering-PDCP;
      set Reordering_PDCP_SN to Next_PDCP_RX_SN, and set Reordering_PDCP_HFN to RX_HFN;

One example (Example 4) is described below in accordance with embodiments of the current invention.
  if received PDCP SN=Last_Submitted_PDCP_RX_SN+1 or received PDCP SN=Last_Submitted_PDCP_RX_SN−Maximum_PDCP_SN:
    deliver to upper layers in ascending order of the associated COUNT value:
      all stored PDCP SDU(s) with consecutively associated COUNT value(s) starting from the COUNT value associated with the stored PDCP SDU;
      set Last_Submitted_PDCP_RX_SN to the PDCP SN of the last PDCP SDU delivered to upper layers;
      set Last_Submitted_PDCP_HFN to the PDCP SN of the last PDCP SDU delivered to upper layers;
      if Last_Submitted_PDCP_RX_SN+1 is larger than Maximum_PDCP_SN:
        set Last_Submitted_PDCP_RX_SN+1 to 0;
        use COUNT corresponding to Last_Submitted_PDCP_RX_SN+1 based on Last_Submitted_PDCP_HFN+1 and SN=0;
    If COUNT corresponding to Next_PDCP_RX_SN>COUNT corresponding to Old Next_PDCP_RX_SN;
      start a t-reordering-PDCP;
      set Reordering_PDCP_SN to Next_PDCP_RX_SN, and set Reordering_PDCP_HFN to RX_HFN for this t-reordering-PDCP;
  For each t-reordering-PDCP, if t-reordering-PDCP is running:
    If COUNT corresponding to Reordering_PDCP_SN<=COUNT corresponding to Last_Submitted_PDCP_RX_SN+1;
      stop and reset t-reordering-PDCP;
    When a t-reordering-PDCP expires,
      deliver to upper layers in ascending order of the associated COUNT value:
        all stored PDCP SDU(s) with an associated COUNT value less than the COUNT value corresponding to Reordering_PDCP_SN;
        set Last_Submitted_PDCP_RX_SN to the PDCP SN of the last PDCP SDU delivered to upper layers.

For split RBs, at reception of a PDCP Data PDU from lower layers, the UE shall:
  if received PDCP SN−Last_Submitted_PDCP_RX_SN>Reordering_Window or 0<=Last_Submitted_PDCP_RX_SN−received PDCP SN<Reordering_Window:
    if received PDCP SN>Next_PDCP_RX_SN:
      decipher the PDCP PDU, using COUNT based on RX_HFN−1 and the received PDCP SN;
    else:
      decipher the PDCP PDU, using COUNT based on RX_HFN and the received PDCP SN;
    perform header decompression (if configured);
    discard this PDCP SDU;
  else if Next_PDCP_RX_SN−received PDCP SN>Reordering_Window:
    increment RX_HFN by one;
    use COUNT based on RX_HFN and the received PDCP SN for deciphering the PDCP PDU;
    set Next_PDCP_RX_SN to the received PDCP SN+1;
  else if received PDCP SN−Next_PDCP_RX_SN>=Reordering_Window:
    use COUNT based on RX_HFN−1 and the received PDCP SN for deciphering the PDCP PDU;
  else if received PDCP SN>=Next_PDCP_RX_SN:

* * *

If received PDCP SN>Next_PDCP_RX_SN:
  set Old Next_PDCP_RX_SN to Next_PDCP_RX_SN;
  set Old_Rx_HFN to RX_HFN;
These two steps for Example 4.

* * * use COUNT based on RX HFN and the received PDCP SN for deciphering the PDCP PDU;
  set Next_PDCP_RX_SN to the received PDCP SN+1;
  if Next_PDCP_RX_SN is larger than Maximum_PDCP_SN:
    set Next_PDCP_RX_SN to 0;
    increment RX_HFN by one;
  else if received PDCP SN<Next_PDCP_RX_SN:
    use COUNT based on RX HFN and the received PDCP SN for deciphering the PDCP PDU;
    if the PDCP PDU has not been discarded in the above:
      perform deciphering and header decompression (if configured) for the PDCP PDU;
      if a PDCP SDU with the same PDCP SN is stored:
        discard this PDCP SDU;
      else:
        store the PDCP SDU;

One example (Example 5) is described below in accordance with embodiments of the current invention.
  if received PDCP SN=Status_PDCP_SN:
    set Status_PDCP_SN to the PDCP SN of the first PDCP SDU with SN>current Status_PDCP_SN which has not been received;
  if received PDCP SN=Last_Submitted_PDCP_RX_SN+1 or received PDCP SN=Last_Submitted_PDCP_RX_SN−Maximum_PDCP_SN:
    deliver to upper layers in ascending order of the associated COUNT value:

all stored PDCP SDU(s) with consecutively associated COUNT value(s) starting from the COUNT value associated with the stored PDCP SDU;
set Last_Submitted_PDCP_RX_SN to the PDCP SN of the last PDCP SDU delivered to upper layers;
set Last_Submitted_PDCP_HFN to the PDCP SN of the last PDCP SDU delivered to upper layers;
if Last_Submitted_PDCP_RX_SN+1 is larger than Maximum_PDCP_SN:
    set Last_Submitted_PDCP_RX_SN+1 to 0;
    use COUNT corresponding to Last_Submitted_PDCP_RX_SN+1 based on Last_Submitted_PDCP_HFN+1 and SN=0;
if t-reordering-PDCP is running:
    If COUNT corresponding to Reordering_PDCP_SN<=COUNT corresponding to Last_Submitted_PDCP_RX_SN+1;
    stop and reset t-reordering-PDCP;
if t-reordering-PDCP is not running:
    If COUNT corresponding to Next_PDCP_RX_SN>COUNT corresponding to Last_Submitted_PDCP_RX_SN+1;
    start t-reordering-PDCP;
    set Reordering_PDCP_SN to Next_PDCP_RX_SN, and
    set Reordering_PDCP_HFN to RX_HFN;
When t-reordering-PDCP expires,
    update Status_PDCP_SN to the SN of the first missing PDCP SDU with COUNT>=COUNT corresponding to Reordering_PDCP_SN;
If COUNT corresponding to Next_PDCP_RX_SN>COUNT corresponding to Status_PDCP_SN;
    start t-reordering-PDCP;
    set Reordering_PDCP_SN to Next_PDCP_RX_SN, and set Reordering_PDCP_HFN to RX_HFN.

One example (Example 6) is described below in accordance with embodiments of the current invention.
if received PDCP SN=Status_PDCP_SN:
    set Status_PDCP_SN to the PDCP SN of the first PDCP SDU with SN>current Status_PDCP_SN which has not been received;
if received PDCP SN=Last_Submitted_PDCP_RX_SN+1 or received PDCP SN=Last_Submitted_PDCP_RX_SN Maximum_PDCP_SN:
    deliver to upper layers in ascending order of the associated COUNT value:
    all stored PDCP SDU(s) with consecutively associated COUNT value(s) starting from the COUNT value associated with the stored PDCP SDU;
set Last_Submitted_PDCP_RX_SN to the PDCP SN of the last PDCP SDU delivered to upper layers;
set Last_Submitted_PDCP_HFN to the PDCP SN of the last PDCP SDU delivered to upper layers;
if Last_Submitted_PDCP_RX_SN+1 is larger than Maximum_PDCP_SN:
    set Last_Submitted_PDCP_RX_SN+1 to 0;
    use COUNT corresponding to Last_Submitted_PDCP_RX_SN+1 based on Last_Submitted_PDCP_HFN+1 and SN=0;
If COUNT corresponding to Next_PDCP_RX_SN>COUNT corresponding to Old Next_PDCP_RX_SN;
    start a t-reordering-PDCP;
    set Reordering_PDCP_SN to Next_PDCP_RX_SN, and set Reordering_PDCP_HFN to RX_HFN for this t-reordering-PDCP;
For each t-reordering-PDCP, if t-reordering-PDCP is running:
    If COUNT corresponding to Reordering_PDCP_SN=COUNT corresponding to Status_PDCP_SN;
    stop and reset t-reordering-PDCP;
When t-reordering-PDCP expires,
    update Status_PDCP_SN to the SN of the first missing PDCP SDU with COUNT>=COUNT corresponding to Reordering_PDCP_SN;
If COUNT corresponding to Next_PDCP_RX_SN>COUNT corresponding to Status_PDCP_SN;
    start t-reordering-PDCP;
    set Reordering_PDCP_SN to Next_PDCP_RX_SN, and set Reordering_PDCP_HFN to RX_HFN.

Figure 3:
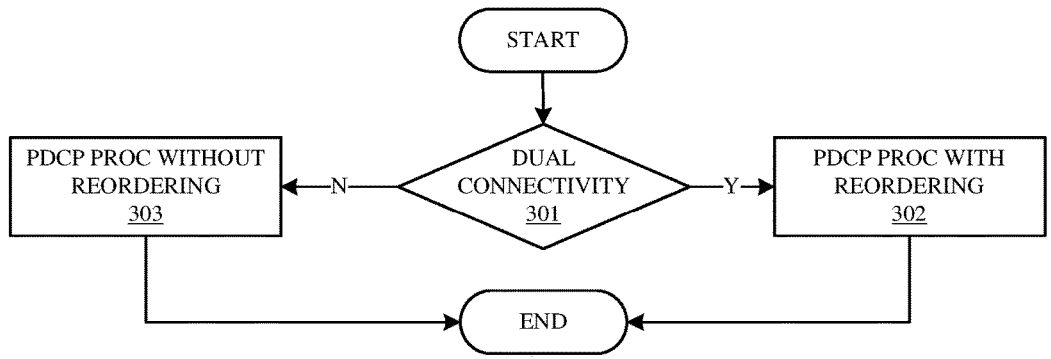
FIG. 3 illustrates a flowchart of an example for a mobile station to re-orders PDCP SDUs based on whether bearer splitting is configured or not in accordance with embodiments of the current invention.

FIG. 3 illustrates a flowchart of an example for a mobile station to re-orders PDCP SDUs based on whether bearer splitting is configured or not in accordance with embodiments of the current invention. If dual connectivity with bearer splitting is configured for the UE in step 301, the PDCP entity will process the PDCP data PDUs with reordering in step 302. Otherwise, it will process the PDCP data PDUs without reordering.

Figures 4A, 4B:
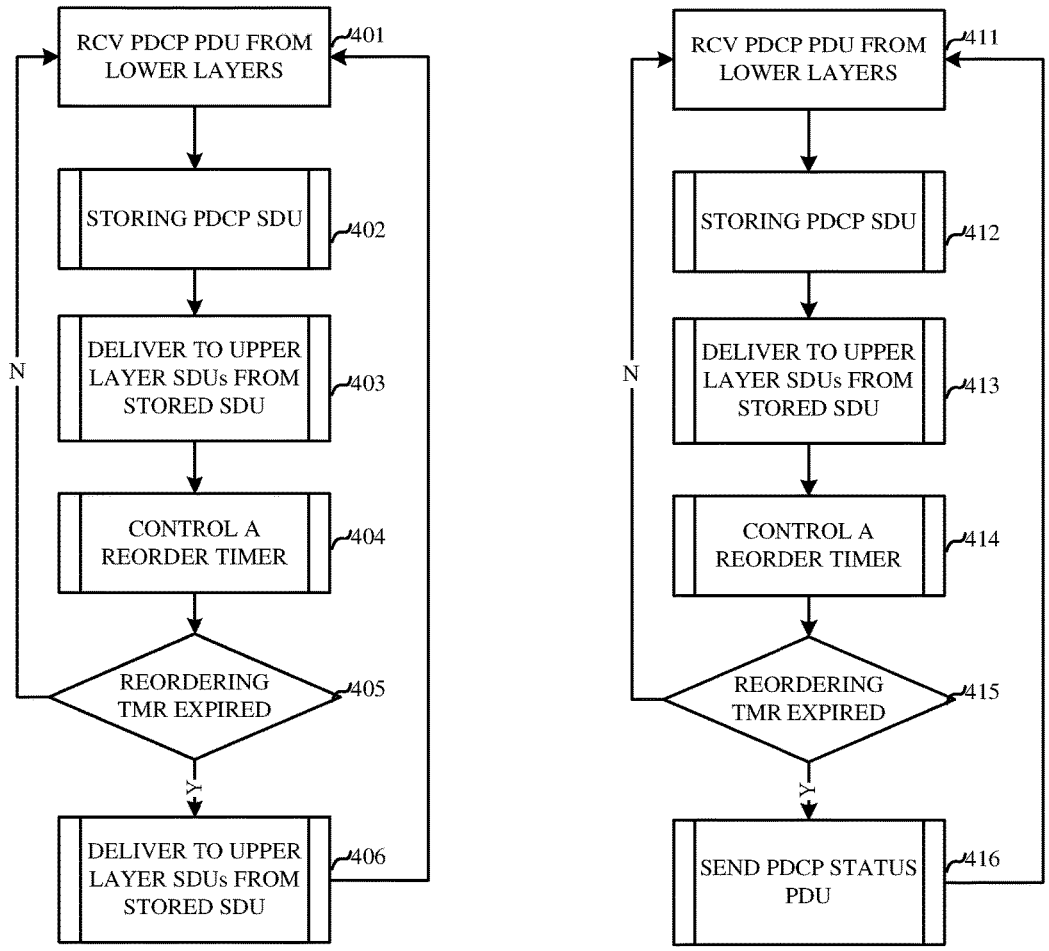
FIG. 4A illustrates a flowchart of an example for a mobile station to process PDCP SDUs of split RBs in accordance with embodiments of the current invention.
FIG. 4B illustrates a flowchart of an example for a mobile station to process PDCP SDUs of split RBs mapped on RLC AM in accordance with embodiments of the current invention.

FIG. 4A illustrates a flowchart of an example for a mobile station to process PDCP SDUs of split RBs in accordance with embodiments of the current invention. The UE receives PDCP data PDU from lower layers in step 401. The UE stores a PDCP SDU in step 402. The UE delivers to upper layers the PDCP SDUs with consecutively associated COUNT value starting from the stored PDCP SDU if the received PDCP SDU is the one following the last PDCP SDU delivered to upper layers in step 403. The UE starts or stops the re-ordering timer depends on whether "SN gaps" still exist in step 404. The UE checks whether the reordering timer expires in step 405. The UE delivers to upper layers the PDCP SDUs if the re-ordering timer expires in step 406. Otherwise, the UE continues receiving PDCP data PDU from lower layers.

FIG. 4B illustrates a flowchart of an example for a mobile station to process PDCP SDUs of split RBs in accordance with embodiments of the current invention. The PDCP entity receives PDCP data PDU from lower layers in step 411 and stores a PDCP SDU in step 412. At step 413, the UE delivers to upper layers the PDCP SDUs with consecutively associated COUNT value starting from the stored PDCP SDU if the received PDCP SDU is the one following the last PDCP SDU delivered to upper layers. The UE starts or stops the re-ordering timer depends on whether "SN gaps" still exist in step 414. The UE checks whether the reordering timer expires in step 415. The UE sends a PDCP Status PDU if the re-ordering timer expires in step 416. Otherwise, the UE continues receiving PDCP data PDU from lower layers.

Figure 5:
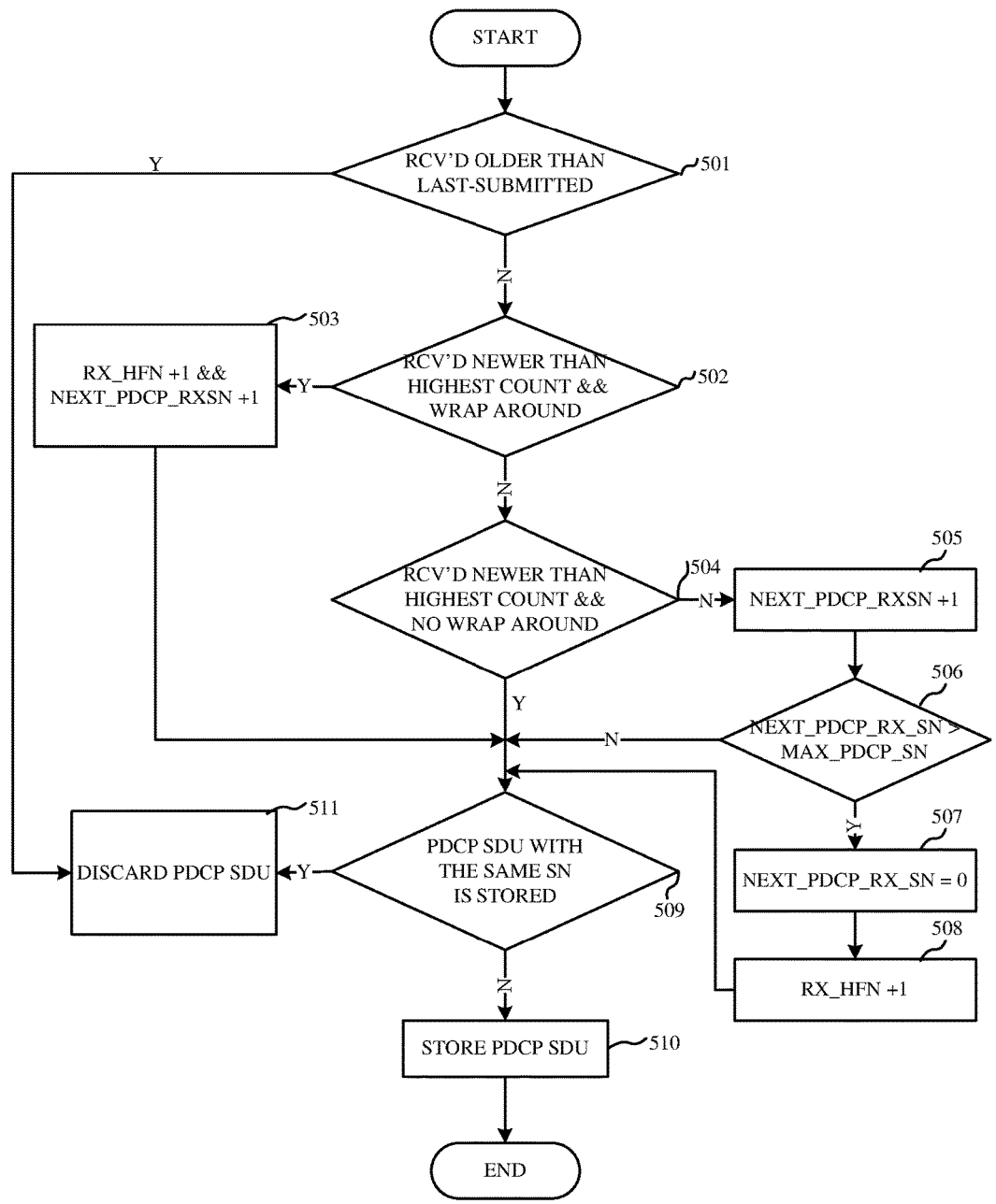
FIG. 5 illustrates a flowchart of an example for a mobile station to store PDCP SDUs mapped on RLC UM or RLC AM in accordance with embodiments of the current invention.

FIG. 5 illustrates a flowchart of an example for a mobile station to store PDCP SDUs mapped on RLC UM or RLC AM in accordance with embodiments of the current invention. When a PDCP data PDU is received from the lower layer, the UE will check whether the received PDCP SDU is older than the last PDCP SDU submitted to higher layer in step 501 and discard it in step 511 if it is the case. Otherwise, if the received PDCP SDU is newer than the PDCP SDU with the highest COUNT value and wrap-around occurs in step 502, UE will increment HFN by one and increment Next_PDCP_RX_SN by one. Otherwise, if the received PDCP SDU is newer than PDCP SDU with highest COUNT and wrap around does not occur in step 504, UE will increment Next_PDCP_RX_SN by one in step 505. If Next_PDCP_RX_SN is larger than Maximum PDCP SN in step 506, it will be set to zero in step 507, which means wrap around occurs. The RX_HFN is incremented by one in step 508. If PDCP SDU with the same SN has been stored in step 509, UE will discard the PDCP SDU in step 511; otherwise, the PDCP SDU is stored in step 510.

Figure 6:
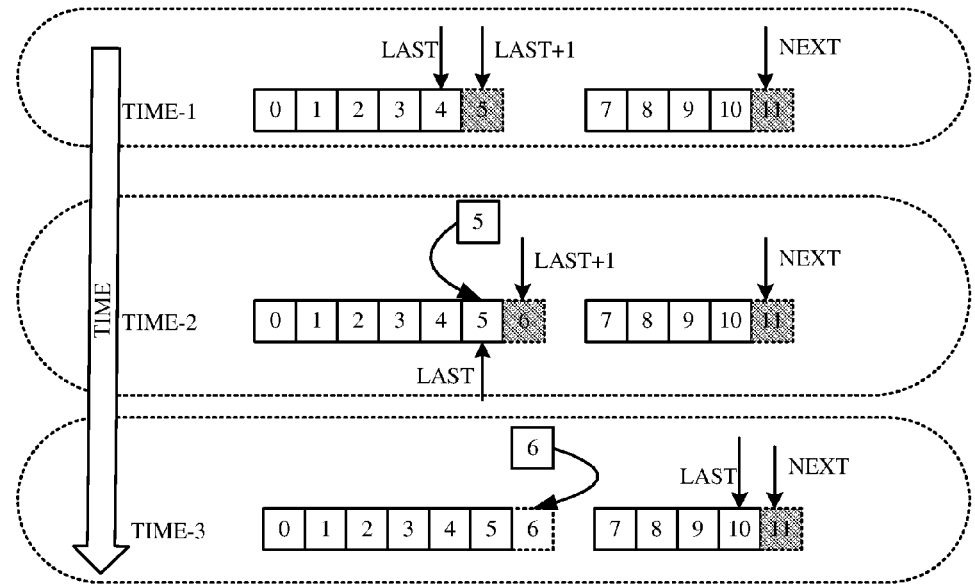
FIG. 6 illustrates an example for a mobile station to deliver to upper layers the stored PDCP SDUs.

FIG. 6 illustrates an example for a mobile station to deliver to upper layers the stored PDCP SDUs. At Time-1, PDCP SDUs with SN 0, 1, 2, 3, 4, 7, 8, 9, and 10 are stored. So Last_Submitted_PDCP_RX_SN is set to 4 and Next_PDCP_RX_SN is set to 11. At Time-2, when PDCP SDU with SN 5 is received, which is the earliest PDCP SDU considered for re-ordering, it is delivered to upper layers. Last_Submitted_PDCP_RX_SN is set to 5. At Time-3, when PDCP SDU with SN 6 is received, which is the earliest PDCP SDU considered for re-ordering, the UE delivers all stored PDCP SDUs with consecutively associated COUNT values starting from SN 6 to upper layers, i.e. PDCP SDUs with SN 6, 7, 8, 9 and 10.

Figure 7:
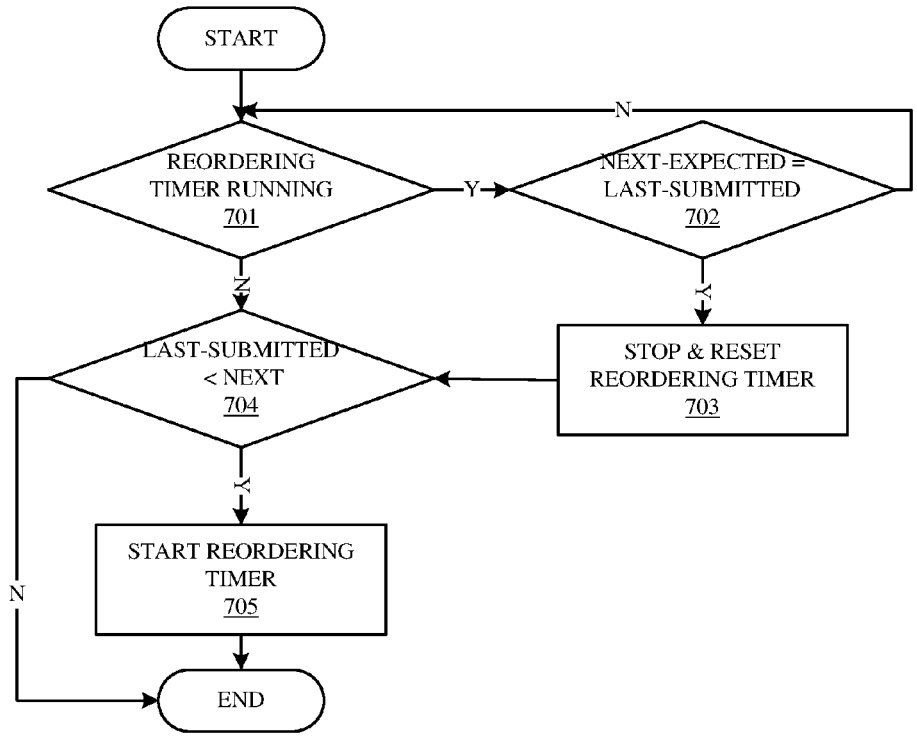
FIG. 7 illustrates a flowchart of an example for a mobile station to control the reordering timer for split RBs in accordance with the embodiments in the invention.

FIG. 7 illustrates a flowchart of an example for a mobile station to control the reordering timer for split RB s in accordance with embodiments of the current invention. If reordering timer is running in step 701, UE will check whether the COUNT value corresponding to Next_PDCP_RX_SN is equal to the COUNT value corresponding to Last_Submitted_PDCP_RX_SN+1 in step 702. If it is the case, which means all SN gaps are closed, UE will stop and reset the reordering timer in step 703, if no in step 702, the UE return to step 701. If the reordering timer is not running, UE will check whether the COUNT value corresponding to Last_Submitted_PDCP_RX_SN+1 is less than the COUNT value corresponding to Next_PDCP_RX_SN in step 704. If it is the case, which means there is SN gap existing, UE will start the reordering timer in step 705.

Figure 8:
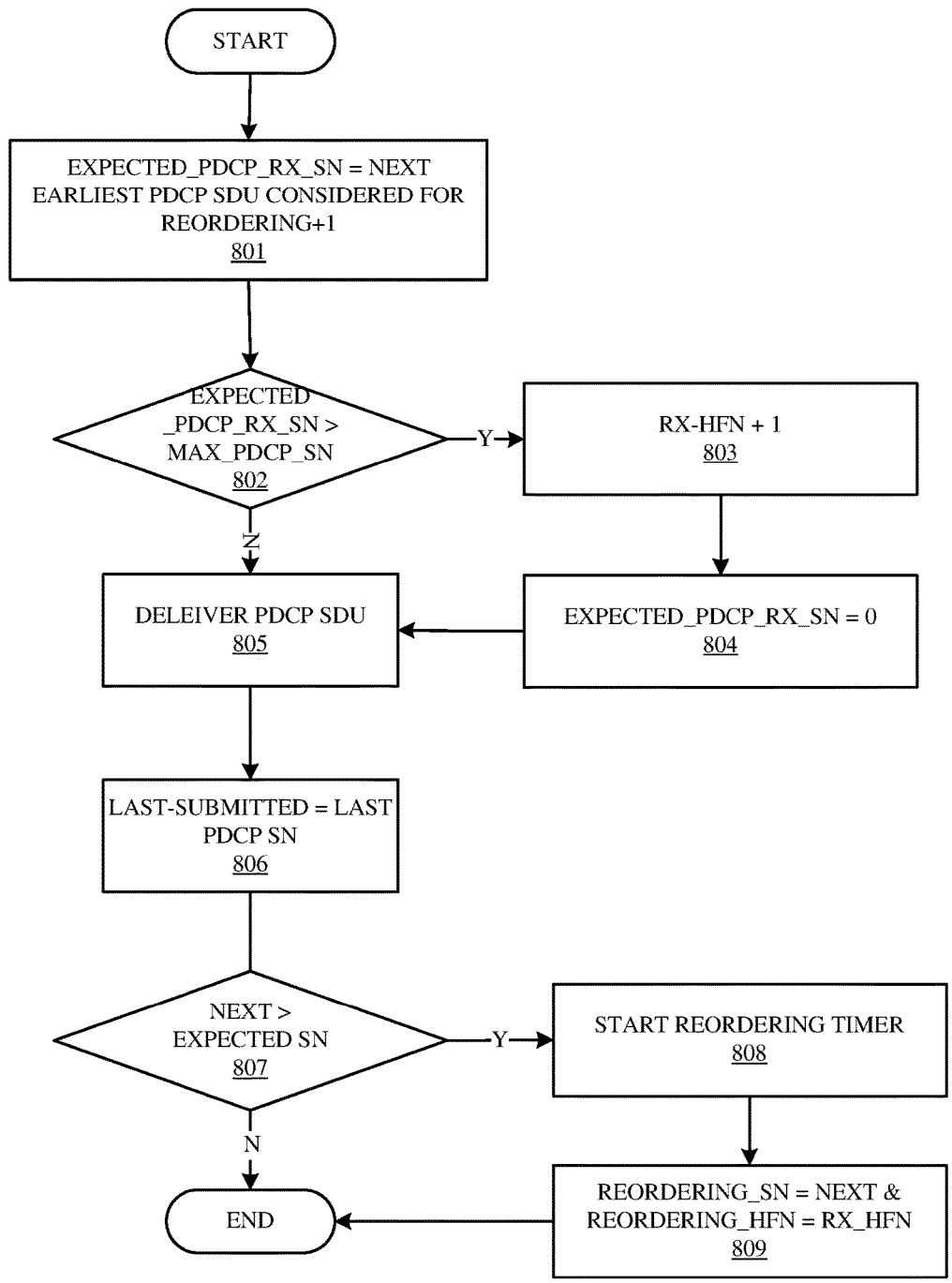
FIG. 8 illustrates a flowchart of an example for a mobile station to deliver to upper layers the PDCP SDUs of split RBs upon expiration of the reordering timer.

FIG. 8 illustrates a flowchart of an example for a mobile station to deliver to upper layers the PDCP SDUs of split RB s upon expiration of the reordering timer. At step 801, the UE sets Expected_PDCP_RX_SN to SN of the next earliest PDCP SDU considered for reordering+1. At step 802, the UE checks if the Expected_PDCP_RX-SN is greater than the MAX_PDCP_SN, which is the maximum PDCP SN number. If Step 802 finds the maximum SN number is not reached, the UE delivers the PDCP SUD at step 805. If the step 802 finds the maximum SN number is reached, the UE performs the wrap-around by adding one to RX_HFN at step 803. The UE then moves to step 804 and sets the Expected_PDCP_RX_SN to be zero. The UE subsequently moves to step 805 and delivers the PDCP SDU. At step 806, the UE sets the Last_Submitted_PDCP_RX_SN to the SN of the last PDCP SDU delivered to upper layers. At step 807, the UE checks whether the NEXT_PDCP_RX_SN COUNT number is greater than the corresponding Expected_PDCP_RX_SN. If step 807 finds no, the process is terminated. If step 807 finds yes, the UE moves to step 808 and starts the re-ordering timer. The UE subsequently moves to step 809, sets the Reordering_PDCP_SN to the Next_PDCP_RX_Sn, and sets the Reordering_PDCP_HFN to RX_HFN. The UE then terminates the process.

Figure 9:
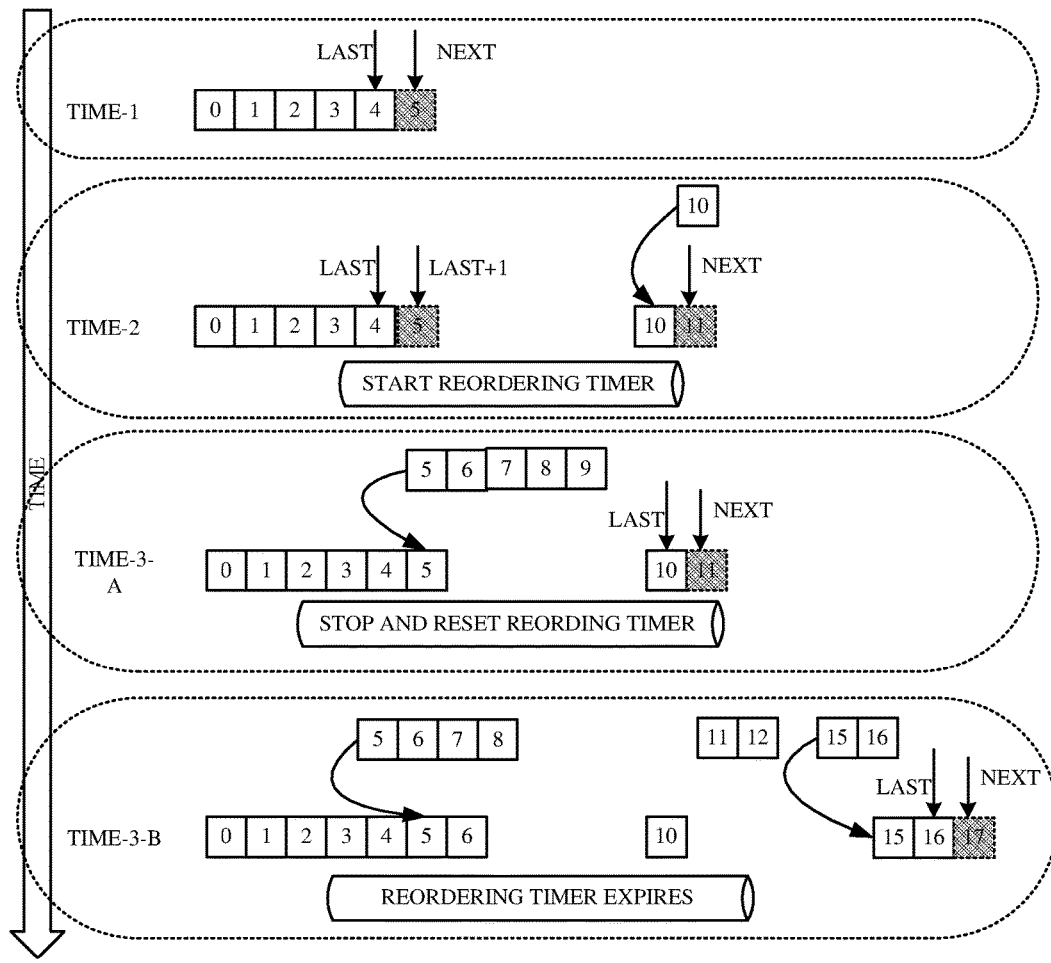
FIG. 9 illustrates an example for a mobile station to deliver to upper layers all stored PDCP SDUs of split RBs upon expiration of the reordering timer.

FIG.9 illustrates an example for a mobile station to deliver to upper layers all stored PDCP SDUs of split RBs upon expiration of the reordering timer. At Time-1, PDCP SDU with SN 0, 1, 2, 3 and 4 are received and delivered to upper layers. At Time-2, PDCP SDU with SN 10 is received. Since an SN gap appears, the reordering timer is started. At Time-3-A, PDCP SDUs with 5~9 are received. Since there is no SN gap, i.e. all the SN gaps are closed, the reordering timer is stopped and reset. If instead the reordering timer expires at Time-3-B, and PDCP SDUs with 5~8, 11, 12, 15 and 16 have already been received, all the stored PDCP SDUs are delivered to upper layers, i.e. PDCP SDUs with SN less than 17. So Last_Submitted_PDCP_SN is updated to 16.

Figure 10:
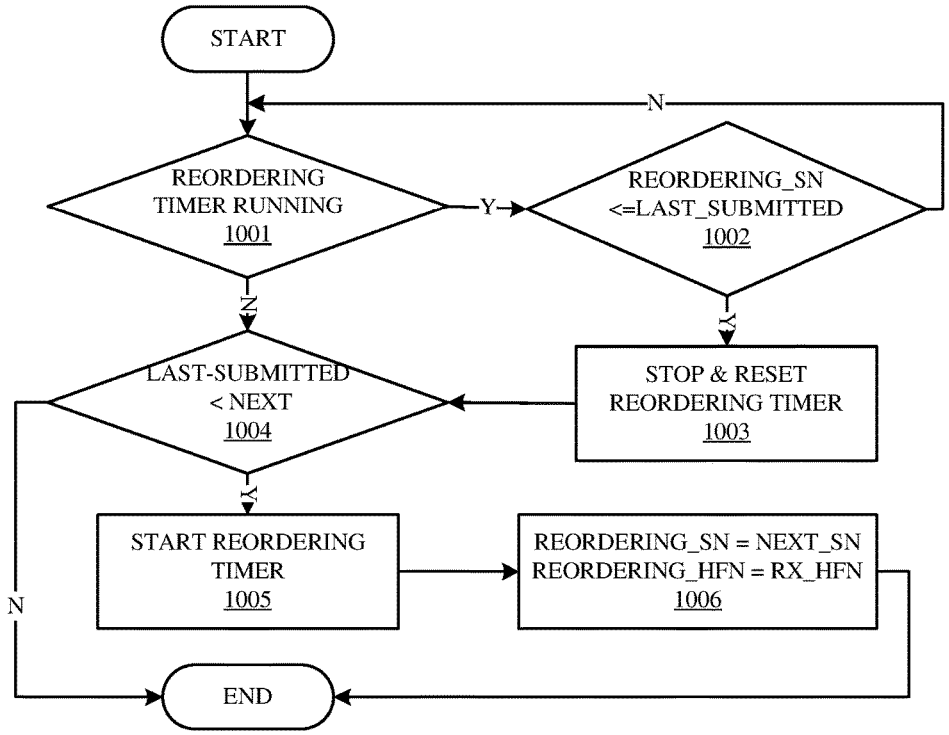
FIG. 10 illustrates an exemplary flowchart for a mobile station to control the reordering timer.

FIG. 10 illustrates a flowchart of an example for a mobile station to control the reordering timer for split RBs in accordance with embodiments of the current invention. If reordering timer is running in step 1001, the UE will check whether the COUNT value corresponding to Reordering_PDCP_SN is less than or equals to the COUNT value corresponding to Last_Submitted_PDCP_RX_SN+1 in step 1002, if no in step 1002, and the UE returns to step 1001. If it is the case, which means the SN gap, which triggered the reordering timer, is closed. The UE will stop and reset the reordering timer in step 1003. If the reordering timer is not running, the UE will check whether the COUNT value corresponding to Next_PDCP_RX_SN is larger than the COUNT value corresponding to Last_Submitted_PDCP_RX_SN+1 in step 1004. If it is the case, which means there is an SN gap, the UE will start the reordering timer in step 1005. The UE will set the state variable Reordering_PDCP_SN to Next_PDCP_RX_SN and Reordering_PDCP_HFN to RX_HFN to hold the value of HFN and SN, which trigger the reordering timer in step 1006.

Figure 11:
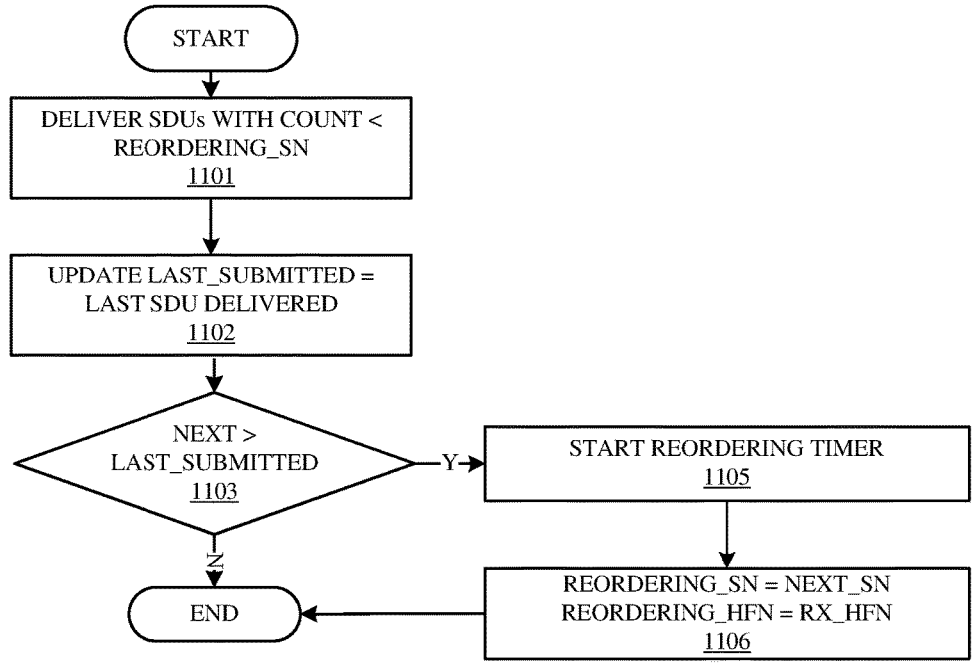
FIG. 11 illustrates an exemplary flowchart for a mobile station to deliver to upper layers parts of the stored PDCP SDUs upon expiration of the reordering timer.

FIG. 11 illustrates a flowchart of an example for a mobile station to deliver to upper layers parts of the stored PDCP SDUs of split RBs upon expiration of the reordering timer. UE delivers to upper layers in ascending order of the associated COUNT value all stored PDCP SDU(s) with an associated COUNT value less than the COUNT value corresponding to Reordering_PDCP_SN in step 1101 and set Last_Submitted_PDCP_RX_SN to the PDCP SN of the last PDCP SDU delivered to upper layers in step 1102. If the COUNT value corresponding to Next_PDCP_RX_SN is larger than the COUNT value corresponding to Last_Submitted_PDCP_RX_SN+1 in step 1103, which means there is SN gap existing, UE will start the reordering timer in step 1104. Then UE sets Reordering_PDCP_SN to Next_PDCP_RX_SN and sets Reordering_PDCP_HFN to RX_HFN in step 1105.

Figure 12:
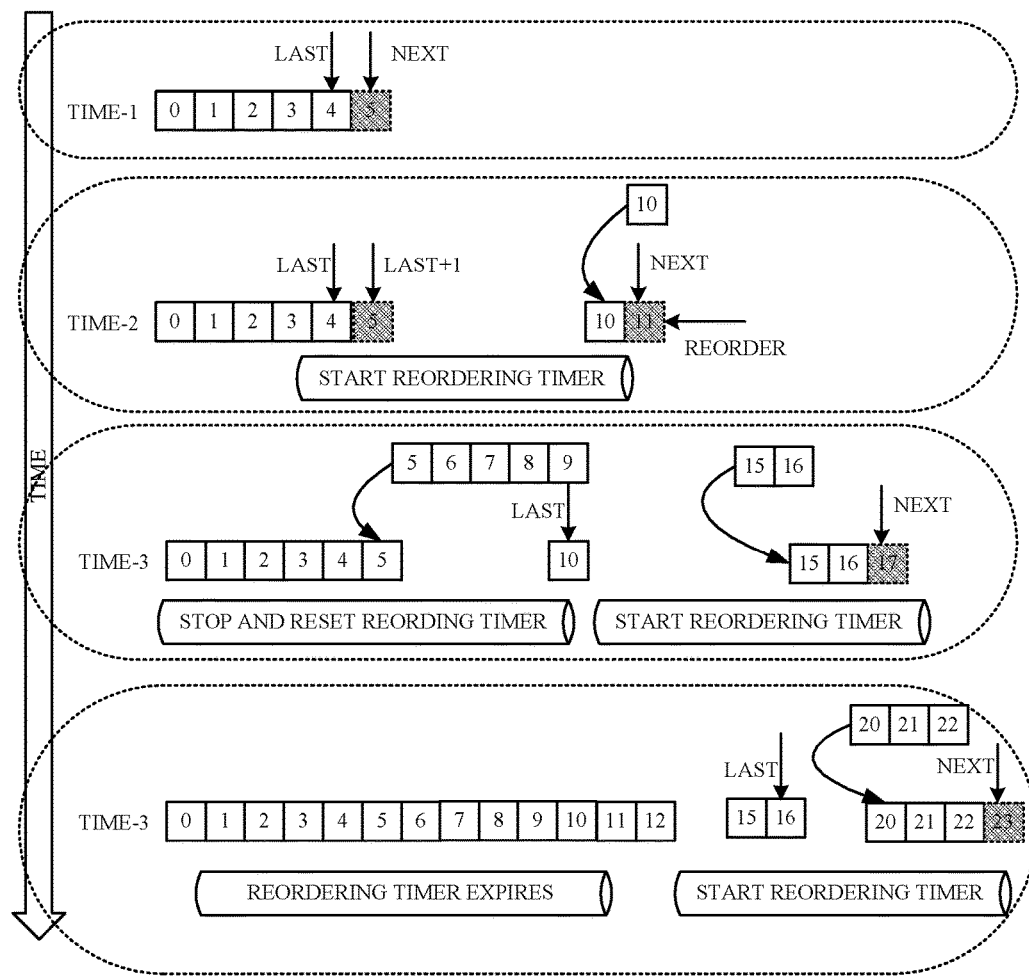
FIG. 12 illustrates an exemplary diagram for a mobile station to deliver to upper layers parts of stored PDCP SDUs upon expiration of the reordering timer.

FIG. 12 illustrates an example for a mobile station to deliver to upper layers parts of stored PDCP SDUs of split RBs upon expiration of the reordering timer. At Time-1, PDCP SDU with SN 0, 1, 2, 3 and 4 are received and delivered to upper layers. At Time-2, PDCP SDU with SN 10 is received. Since a SN gap appears, the reordering timer is started. At Time-3, PDCP SDUs with 5~9, 15 and 16 are received. Since the original SN gap marked by Reordering_PDCP_SN=11 is closed, the reordering time is stopped and reset. Meanwhile, PDCP SDU with 5~10 is delivered to upper layers and Last_Submitted_PDCP_RX_SN is set to 10. However, another SN gap appears due to the reception of PDCP SDU with SN 15 and 16, the reordering timer is started again, with Reordering_PDCP_SN is marked by 17. At Time-4, the reordering timer marked by Reordering_PDCP_SN=17 expires and the PDCP SDUs with SN 20~22 have been received, the PDCP SDUs with SN less than 17 are delivered to upper layers in ascending order of the associated COUNT value regardless of the SN gap, since PDCP SDU with SN 15, 16 are considered as lost. Last_Submitted_PDCP_RX_SN is updated to 16. After the updating of Last_Submitted_PDCP_RX_SN, another SN gap appears due to reception of PDCP SDUs with SN 20~22, so the reordering timer is started again, with Reordering_PDCP_SN marked by 23.

Figure 13:
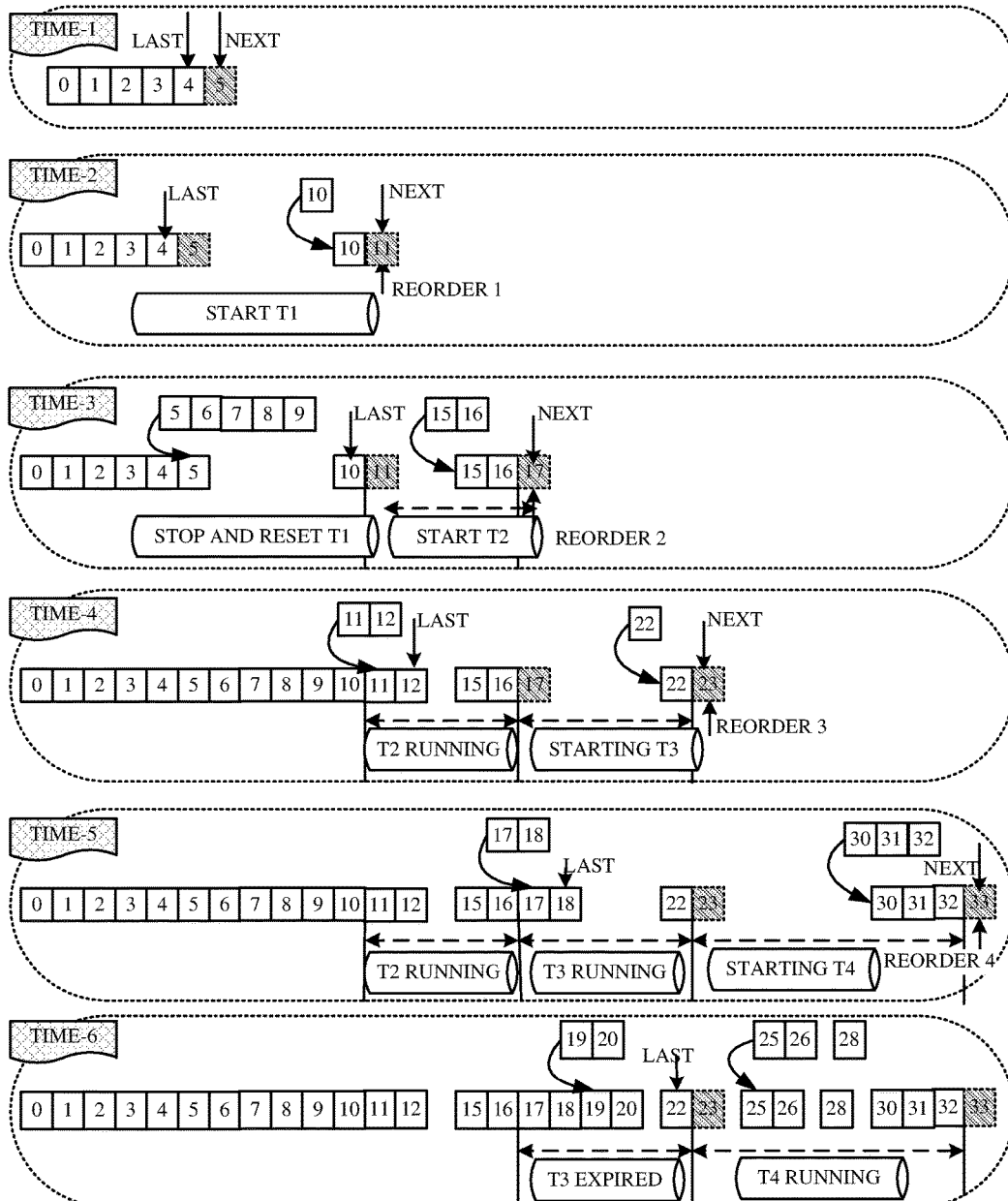
FIG. 13 illustrates an exemplary diagram for a mobile station to deliver to upper layers parts of stored PDCP SDUs upon expiration of each reordering timer.

FIG. 13 illustrates an example for a mobile station to deliver to upper layers parts of stored PDCP SDUs of split RBs upon expiration of each reordering timer. Upon the appearance of each SN gap, a reordering timer is started for it. At Time-1, PDCP SDU with SN 0, 1, 2, 3 and 4 are received and delivered to upper layers. At Time-2, PDCP SDU with SN 10 is received. Since a SN gap appears, a reordering timer (Timer_1) is started, with Reordering_PDCP_SN1 marked by 11. At Time-3, PDCP SDUs with SN 5~9, 15 and 16 have been received. Since the first SN gap marked by 11 is closed, the reordering timer (Timer_1) is stopped and reset. Meanwhile, PDCP SDUs with SN 5~10 are delivered to the upper layer in sequence. However, due to the reception of PDCP SDUs with SN 15 and 16, another SN gap appears. A reordering timer (Timer_2) is started for it with Reordering_PDCP_SN2 set to 17. At Time-4, PDCP SDU with SN 11, 12 and 22 are received. The SN gap marked by Reordering_PDCP_SN2=17 has not been closed, so the corresponding re-ordering timer (Timer_2) keeps running as it is. Due to the reception of PDCP SDU with SN 22, a new SN gap appears. Another reordering timer (Timer_3) is started for it, with Reordering_PDCP_SN3 set to 23. At Time-5, PDCP SDU with SN 17, 18, 30, 31 and 32 are received, but the reordering timer (Timer_2) expires.

So the SN gap marked with Reordering_PDCP_SN2=17 should be closed. The PDCP SDUs with SN less than 17 will be delivered to upper layers, which is PDCP SDU with SN 15 and 17 regardless of the lost PDCP SDUs. Since PDCP SDUs with SN 17 and 18 are also available, they are also delivered to upper layers and the Last_Submitted_PDCP_RX_SN is set to 18. Due to the reception of PDCP SDUs with SN 30~32, a new SN gap appears and a reordering timer (Timer_4) is started for it and the SN gap is marked by Reordering_PDCP_SN4=33. At Time-6, the reordering timer (Timer_3) expires and PDCP SDUs with SN 19, 20, 25, 26 and 28 are received. Due to the expiration of the reordering timer, the PDCP SDUs with SN less than 23 are delivered to upper layers regardless of the lost PDCP SDUs. Since the SN gap marked by Reordering_PDCP_SN4=33 has not been closed, the reordering timer (Timer_4) keeps running as it is.

Figure 14:
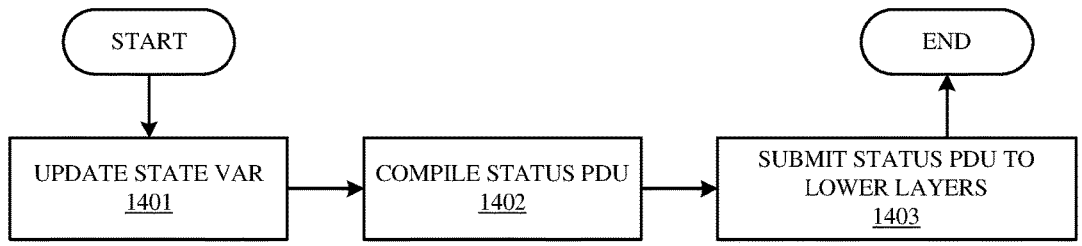
FIG. 14 illustrates an exemplary flowchart for the mobile station to sending a PDCP STATUS PDU in accordance with embodiments of the current invention.

FIG. 14 illustrates an exemplary flowchart for the mobile station to sending a PDCP STATUS PDU. Upon reordering timer expiration, UE updates the state variables for the first PDCP SDU, which is not received but not reported as missing, or for the first not received PDCP SDU in step 1401; compiles the PDCP STATUS PDU according to the state variables in step 1402 and submits to lower layers in step 1403.

Figure 15:
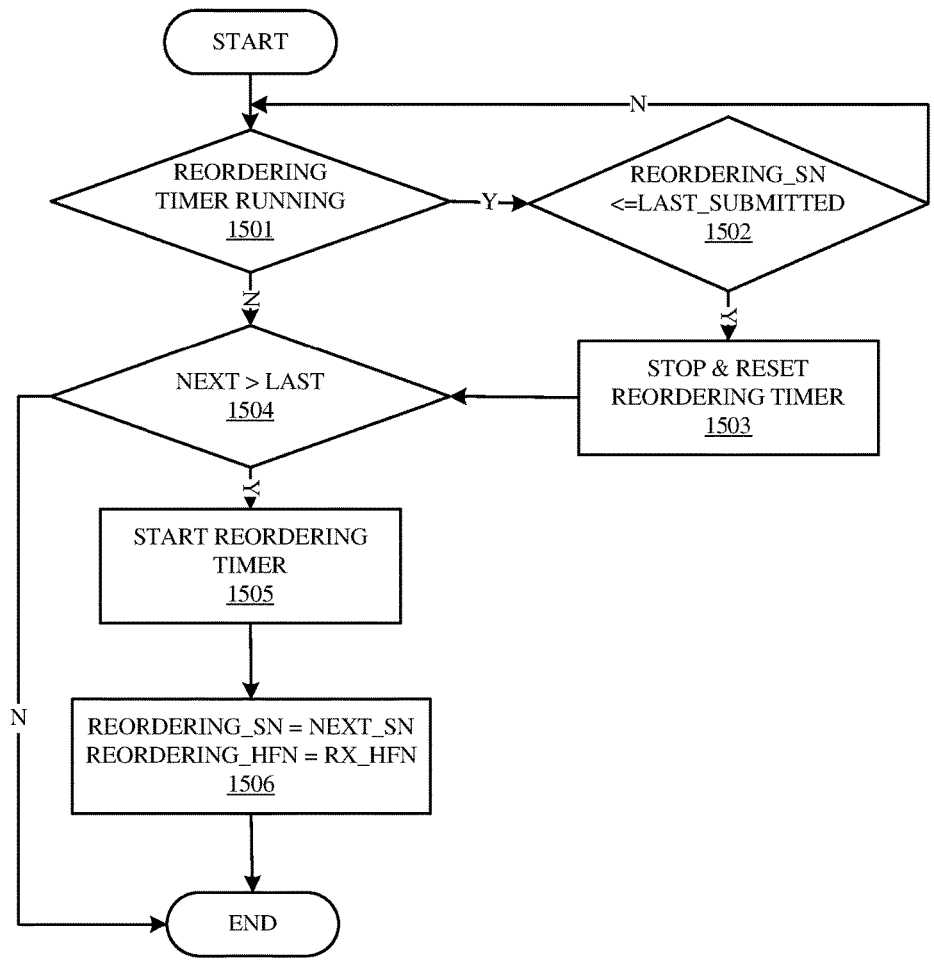
FIG. 15 illustrates an exemplary flowchart for a mobile station to control the reordering timer.

FIG. 15 illustrates an exemplary flowchart for a mobile station to control the reordering timer. If reordering timer is running in step 1501, UE will check whether the COUNT value corresponding to Reordering_PDCP_SN is less than or equal to the COUNT value corresponding to Last_Submitted_PDCP_RX_SN+1 in step 1502. If it is the case, which means the SN gap, which triggered the reordering timer, is closed; UE will stop and reset the reordering timer in step 1503. If no in step 1502, the UE returns to step 1501. If the reordering timer is not running, UE will check whether the COUNT value corresponding to Next_PDCP_RX_SN is larger than the COUNT value corresponding to Last_Submitted_PDCP_RX_SN+1 in step 1504. If it is the case, which means there is SN gap existing, UE will start the reordering timer in step 1505. Then UE will set the state variable Reordering_PDCP_SN to Next_PDCP_RX_SN and Reordering_PDCP_HFN to RX_HFN to hold the value for HFN and SN, which triggers the reordering timer in step 1506.

Figure 16:
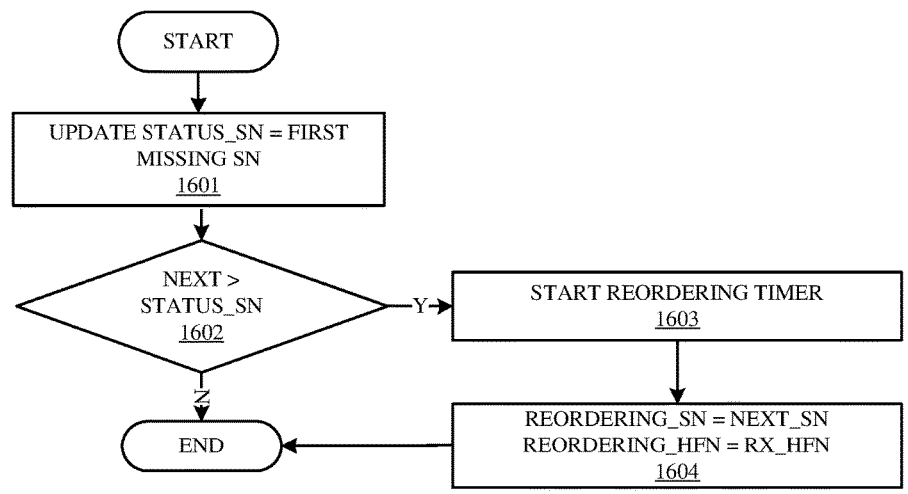
FIG. 16 illustrates an exemplary flowchart for a mobile station to send a PDCP STATU PDU upon expiration of the reordering timer.

FIG. 16 illustrates a flowchart of an example for a mobile station to send a PDCP STATU PDU upon expiration of the reordering timer. UE set Status_PDCP_SN to the PDCP SN of the first missing PDCP SDU with COUNT>=COUNT corresponding to Reordering_PDCP_SN in step 1601. If the COUNT value corresponding to Next_PDCP_RX_SN is larger than the COUNT value corresponding to Status_PDCP_SN in step 1602, which means there is SN gap existing, UE will start the reordering timer in step 1603. Then UE sets Reordering_PDCP_SN to Next_PDCP_RX_SN and sets Reordering_PDCP_HFN to RX_HFN in step 1604.

Figure 17:
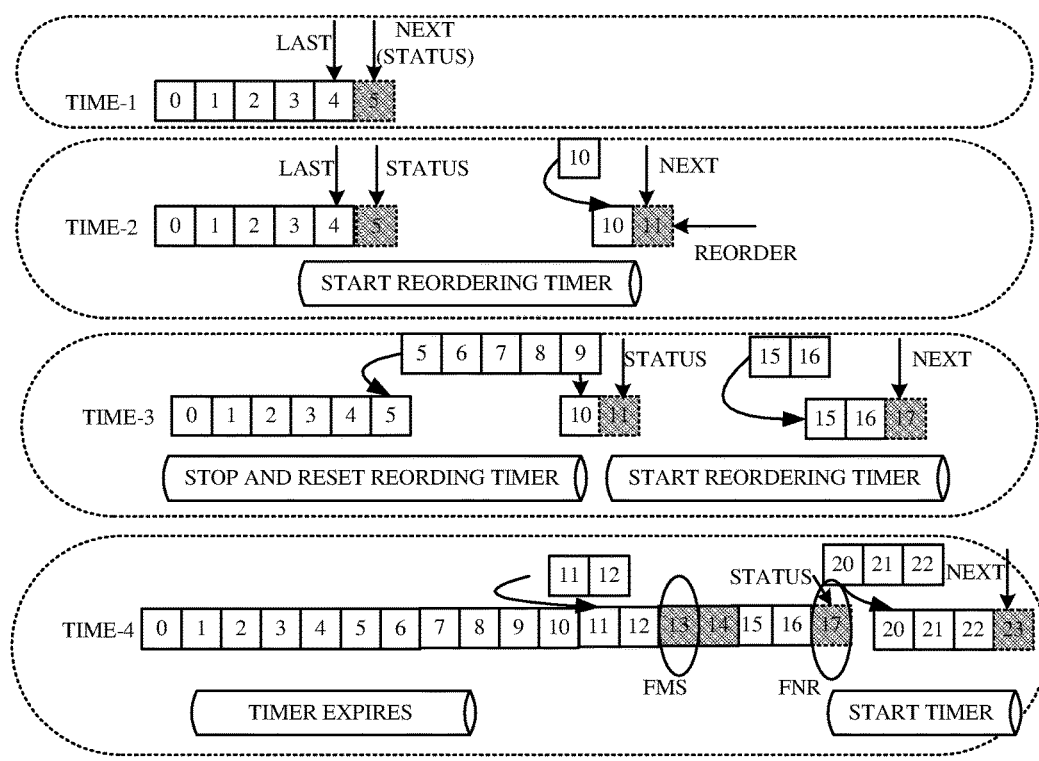
FIG. 17 illustrates an exemplary diagram for the mobile station to deliver to upper layers the stored PDCP SDUs and send a PDCP STATUS PDU upon expiration of the reordering timer.

FIG. 17 illustrates an example for the mobile station to deliver to upper layers the stored PDCP SDUs and send a PDCP STATUS PDU upon expiration of the reordering timer. At Time-1, PDCP SDU with SN 0, 1, 2, 3 and 4 are received and delivered to upper layers. At Time-2, PDCP SDU with SN 10 is received. Since an SN gap appears, the reordering timer is started. At Time-3, PDCP SDUs with 5~9, and 16 are received. Since the original SN gap marked by Reordering_PDCP_SN=11 is closed, the reordering time is stopped and reset. Meanwhile, PDCP SDU with 5~10 is delivered to upper layers and Last_Submitted_PDCP_RX_SN is set to 10. The Status_PDCP_SN is set to 11. However, another SN gap appears due to the reception of PDCP SDU with SN 15 and 16, the reordering timer is started again, with Reordering_PDCP_SN is marked by 17. At Time-4, the reordering timer marked by Reordering_PDCP_SN=17 expires and the PDCP SDUs with SN 11~12 and 20~22 have been received; the PDCP SDUs with SN 11 and 12 are delivered to upper layers in sequence. Last_Submitted_PDCP_RX_SN is updated to 12. Status_PDCP_SN is updated to the first PDCP SDU that is not received but not reported as missing with COUNT value equal to or larger than 17. Status_PDCP_SN is set to 17. FMS is set to 13, which is the first missing PDCP SDU. FNR is set to 17, which is the first not received PDCP SDU but not reported as missing. The bit corresponding to PDCP SDU with SN14 is set to 0 in the bit map, which is also considered as missing. After the updating of Status_PDCP_SN, another SN gap appears due to reception of PDCP SDUs with SN 20~22. The reordering timer is started again, with Reordering_PDCP_SN marked by 23.

Figure 18:
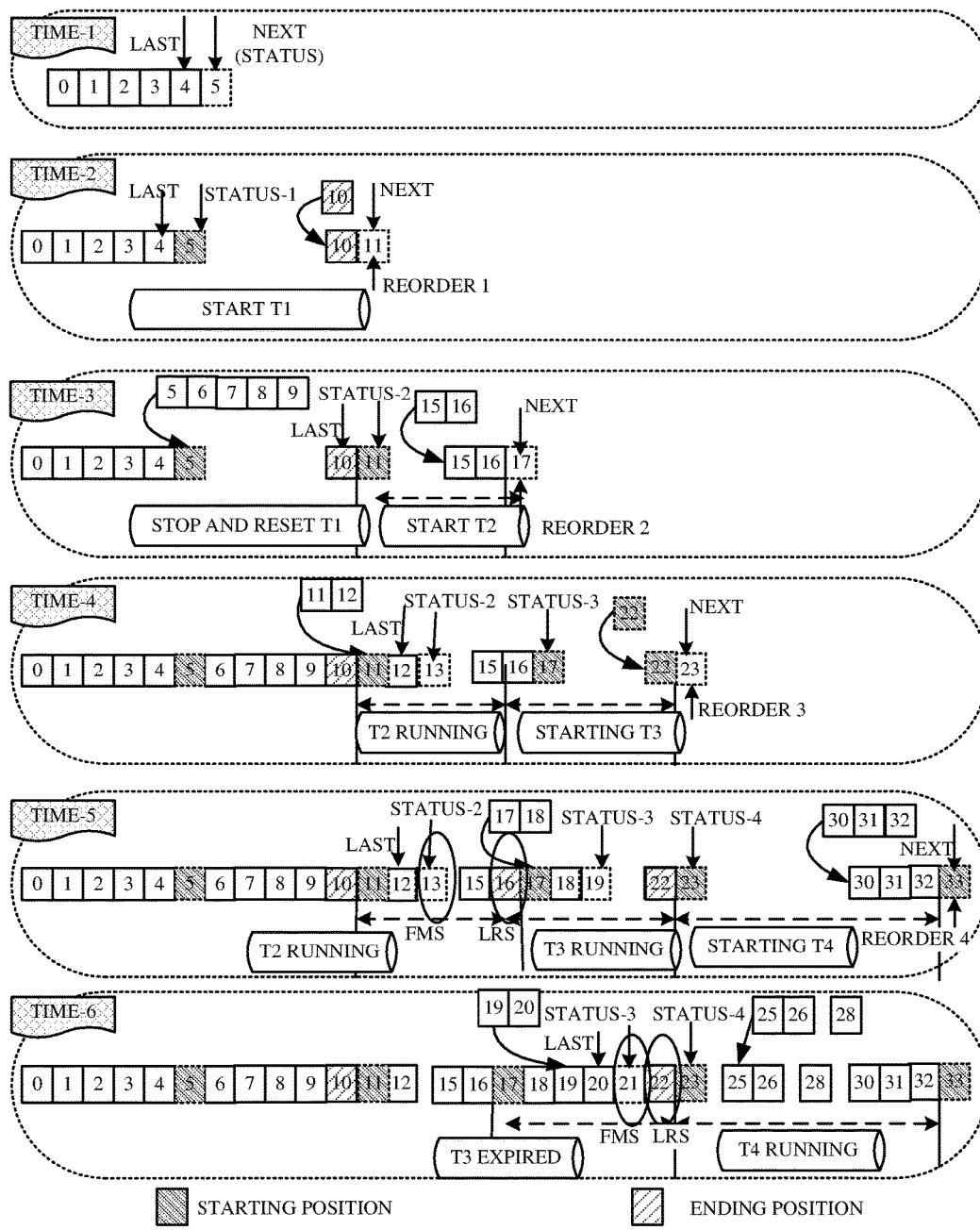
FIG. 18 illustrates an exemplary diagram for a mobile station to deliver to upper layers the stored PDCP SDUs and send PDCP STATUS PDU upon expiration of each reordering timer.

FIG. 18 illustrates an example for a mobile station to deliver to upper layers the stored PDCP SDUs and send PDCP STATUS PDU upon expiration of each reordering timer. Upon the appearance of each SN gap, a reordering timer is started for it. At Time-1, PDCP SDU with SN 0, 1, 2, 3 and 4 are received and delivered to upper layers. At Time-2, PDCP SDU with SN 10 is received. Since an SN gap appears, a reordering timer (Timer_1) is started, with Reordering_PDCP_SN1 marked by 11. Status_PDCP_SN1 is set to 5, which is also the starting position of the SN gap. At Time-3, PDCP SDUs with SN 5~9, 15 and 16 have been received. Since the first SN gap marked by 11 is closed, the reordering timer (Timer_1) is stopped and reset. Meanwhile, PDCP SDUs with SN 5~10 are delivered to the upper layer in sequence. Last_Submitted_PDCP_RX_SN is set to 10. However, due to the reception of PDCP SDUs with SN 15 and 16, another SN gap appears, a reordering timer (Timer_2) is started for it with Reordering_PDCP_SN2 set to 17. Status_PDCP_SN2 is initialized to 11, which is also the starting position of the SN gap. At Time-4, PDCP SDU with SN 11, 12 and 22 are received. Due to the reception of the PDCP SDUs with SN 11 and 12, they are delivered to upper layers in sequence and Last_Submitted_PDCP_RX_SN is updated to 12. The SN gap marked by Reordering_PDCP_SN2=17 has not been closed, so the corresponding re-ordering timer (Timer_2) keeps running as it is. Due to the reception of PDCP SDU with SN 22, a new SN gap appears. Another reordering timer (Timer_3) is started for it, with Reordering_PDCP_SN3 set to 23. Status_PDCP_SN3 is initialized to 17. At Time-5, PDCP SDU with SN 17, 18, 30, 31 and 32 are received, but the reordering timer (Timer_2) expires. So a PDCP Status PDU for the SN gap marked with Reordering_PDCP_SN2=17 should be reported. Based on Status_PDCP_SN2, FMS and LRS for this SN gap are 13 and 16. Due to the reception of PDCP SDUs with SN 30~32, a new SN gap appears and a reordering timer (Timer_4) is started for it and the SN gap is marked by Reordering_PDCP_SN4=33. At Time 6, the reordering timer (Timer_3) expires and PDCP SDUs with SN 13, 14, 19, 20, 25, 26 and 28 are received. Since PDCP SDUs with SN 13 and 14 are received, they are delivered to upper layers together with PDCP SDUs with SN from 15 to 20. So Last_Submitted_PDCP_RX_SN is updated to 20. Due to the expiration of the reordering timer, a PDCP Status PDU for the SN gap should be sent, with FMS and LRS set to 21 and 22 respectively. Since the SN gap marked by Reordering_PDCP_SN4=33 has not been closed, the reordering timer (Timer_4) keeps running as it is.

Figure 19:
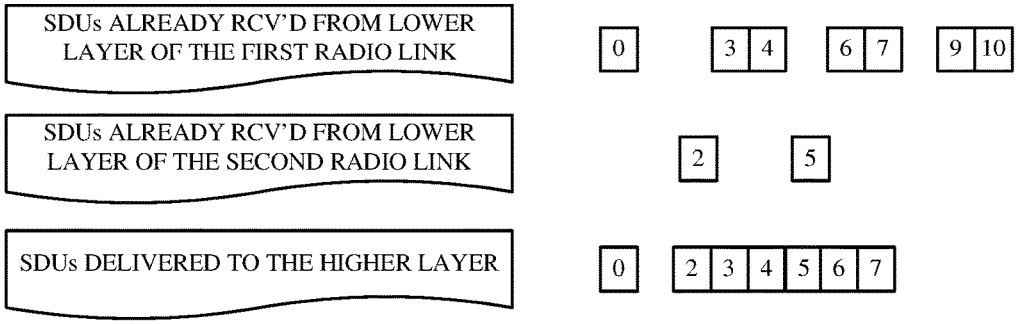
FIG. 19 illustrates an exemplary diagram for the mobile station to deliver data to upper layers in the presence of SN gaps and to track on which radio link PDUs has been received.

In another embodiment, illustrated in FIG. 19, the PDCP layer has already received from lower layers of a first Radio Link PDUs corresponding to PDCP SDU SN 0, 3, 4, 6, 7, 9, 10, which has been stored and buffered. In this embodiment, it is assumed that lower layer perform re-ordering per radio link, and thus we assume that missing PDCP SDUs with SN 1, 2, 5, 8 will not be received by the first radio link, but may be received by the second radio link. Then, in this example, PDUs are received by the second Radio Link corresponding to PDCP SN 2 and 5. As lower layers of also the second radio link are assumed to do reordering, further delivery of Data for PDCP SDU with SN 1 is not expected, and it is considered lost. This would thus trigger the delivery to the upper layer of SDUs with SN 0, 2, 3, 4, 5, 6, 7. The data for SDU with SN 8 is still missing; it can still be delivered by the second radio link. Thus, the SDUs with SN 9 and 10 are still kept in the buffer, waiting for SDU with SN 8. In general, if we assume that reordering is done in the lower layers, the PDCP layer could always deliver to upper layers all buffered SDUs with SN up to SN=the smallest of the highest SN delivered from lower layers of any of the radio links, i.e. if X1=highest SN delivered from the first Radio Link and X2=highest SN delivered from the second Radio Link, then if lower layers does reordering, PDCP can always deliver to higher layers all data corresponding to SN<=min (X1, X2). In addition, the PDCP would deliver buffered SDUs with consecutive SNs in ascending order, as shown in the example where SDUs with SN 6 and 7 are also delivered to upper layers. The example shown in FIG. 14 may also be complemented by other solutions, e.g. a reordering timer to handle situations when lower layers stops delivering data.

Figure 20:
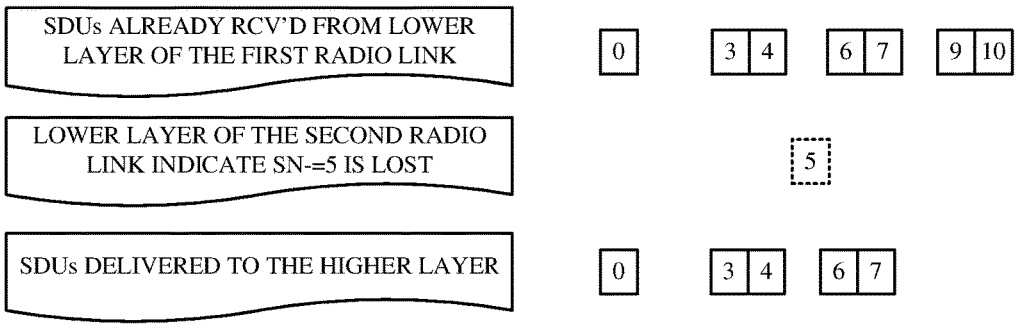
FIG. 20 illustrates an exemplary diagram for the mobile station to deliver data to upper layers in the presence of SN gaps and receive notification from lower layer that lower layers has stopped trying to receive PDUs up to a certain PDU.

In another embodiment, illustrated in FIG. 20, the PDCP layer has already received from lower layers of a first Radio Link PDUs corresponding to PDCP SDU SN 0, 3, 4, 6, 7, 9, 10, which has been stored and buffered. In this embodiment, it is assumed that lower layer perform re-ordering per radio link, and thus we assume that missing PDCP SDUs with SN 1, 2, 5, 8 will not be received by the first radio link, but may be received by the second radio link. Then, in this example, lower layers of the second Radio Link gives up trying to receive PDUs up to the PDU corresponding to PDCP SDU SN 5. Lower layers could do this e.g. if there is an explicit discard procedure supported. As lower layers of also the second radio link are assumed to do reordering, further delivery of Data for PDCP SDU with SN 1, 2, 5 is not expected, and they are considered lost. This would thus trigger the delivery to the upper layer of SDUs with SN 0, 3, 4, 6, 7. The data for SDU with SN 8 is still missing; it can still be delivered by the second radio link. The SDUs with SN 9 and 10 are still kept in the buffer, waiting for SDU with SN 8.

Figure 21:
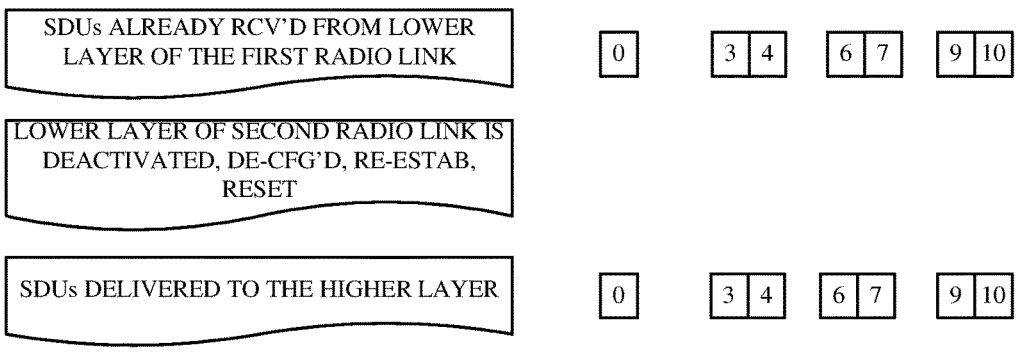
FIG. 21 illustrates an exemplary diagram of data loss when the lower layer of a Radio Link is deactivated, de-configured, reset, re-established or restarted.

In the example in FIG. 21, the lower layer of the second Radio Link is deactivated, de-configured, reset, re-established or restarted. When such event happens, it is assumed that all data in the pipe of the second radio link is lost, and none of the missing pieces of data may be delivered by this radio link. It is further assumed that the lower layer of the first Radio Link performs reordering and that the missing data will not be delivered by it. The result is that all buffered PDUs are delivered to the higher layer.

A main benefit of embodiments shown in FIGS. 19, 20, 21 is the reuse of reordering functionality is lower layers, allowing PDCP reordering to be very simple. Note that for these embodiments, COUNT and SN are used in this document interchanging. If SN is used it is implied that wrap-around is taken into account, i.e. so in the text when it says one SN is smaller than or larger than another SN, COUNT could be considered rather than SN as it already takes wraparound into account. The protocol SN, which is closest to window leading edge, is considered the highest, e.g. if window leading edge is at SN=20, SN=18 is considered higher than SN=8300.

Figure 22:
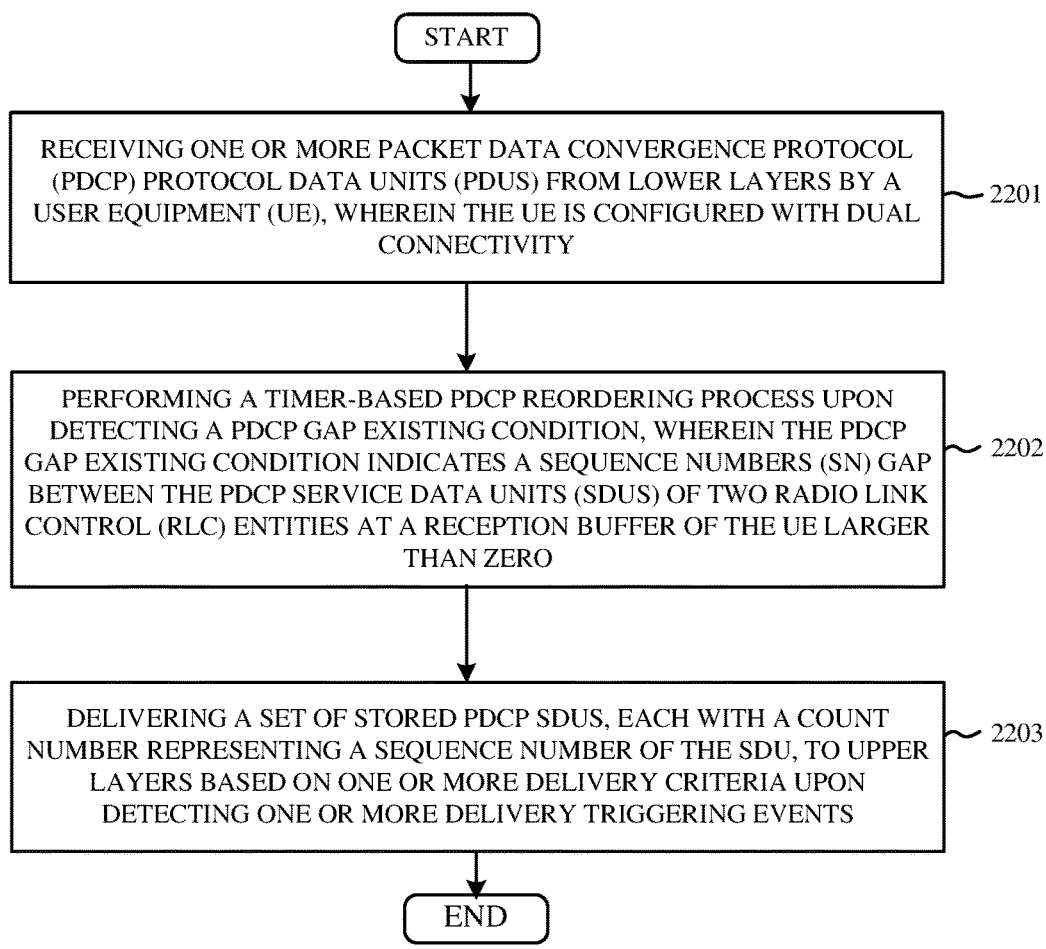
FIG. 22 is an exemplary flow chart for a timer-based reordering process in accordance with embodiments of the current invention.

FIG. 22 is an exemplary flow chart for a timer-based reordering process in accordance with embodiments of the current invention. At step 2201, the UE receives one or more packet data convergence protocol (PDCP) protocol data units (PDUs) from lower layers. At step 2202, the UE performs a timer-based PDCP reordering process upon detecting a PDCP gap condition, wherein the PDCP gap existing condition indicates a sequence numbers (SN) gap between the PDCP service data units (SDUs) of two parallel radio link control (RLC) bearers at a reception buffer of the UE larger than zero. At step 2203, the UE delivering a set of PDCP service data units (SDUs), each with a COUNT number representing a sequence number of the SDU, to upper layers based on one or more delivery criteria upon detecting one or more delivery triggering events.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method comprising:
   receiving one or more packet data convergence protocol (PDCP) protocol data units (PDUs) from lower layers by a user equipment (UE);
   performing a timer-based PDCP reordering process upon detecting a PDCP gap existing condition, wherein the PDCP gap existing condition indicates a sequence numbers (SN) gap between the PDCP service data units (SDUs) of two radio link control (RLC) entities at a reception buffer of the UE is larger than zero; and
   delivering a set of PDCP SDUs, each with a COUNT number representing a sequence number of the SDU, to upper layers based on one or more delivery criteria upon detecting one or more delivery triggering events.

2. The method of claim 1, wherein the PDCP gap existing condition is detected when there is at least one stored PDCP SDU.

3. The method of claim 2, wherein the PDCP reordering process starts a reordering timer when detecting the PDCP existing gap condition.

4. The method of claim 2, wherein the PDCP reordering process stops and resets a running reordering timer upon detecting a PDCP gap-closing condition.

5. The method of claim 4, wherein the PDCP gap-closing condition is detected when a reordering SDU COUNT number associated with the running reordering timer is smaller than or equal to the last-delivered SDU COUNT number plus one.

6. The method of claim 1, wherein the PDCP reordering process further comprising: storing corresponding received SDUs and setting a next-expected SDU COUNT number to be equal to a largest SDU COUNT number received plus one.

7. The method of claim 6, wherein the PDCP reordering process further comprising: setting a reordering SDU COUNT number to be equal to the next-expected SDU COUNT number, wherein the reordering SDU COUNT number is associated with a reordering timer.

8. The method of claim 6, wherein when the UE is configured with dual connectivity.

9. The method of claim 1, wherein the delivery triggering event is detecting the received SDU COUNT number equals to a last-submitted SDU COUNT number plus one.

10. The method of claim 9, wherein the delivered set of SDUs includes all stored PDCP SDUs with consecutively associated COUNT numbers starting from the received SDU COUNT number.

11. The method of claim 10, further comprising: setting the last-submitted SDU COUNT number to the COUNT number of last PDCP SDU delivered to upper layers.

12. The method of claim 1, wherein the delivery triggering event is an expiration of a reordering timer, wherein the reordering timer is started by the timer-based PDCP reordering process.

13. The method of claim 12, wherein the delivered set of SDUs includes all stored PDCP SDUs with associated COUNT numbers less than a reordering SDU COUNT number, wherein the reordering SDU COUNT number is associated with the reordering timer.

14. The method of claim 13, further comprising: setting a last-submitted SDU COUNT number to the COUNT number of last PDCP SDU delivered to upper layers.

15. The method of claim 14, further comprising: starting a reordering timer upon detecting one or more stored SDU after the delivery of the set of SDUs and setting a reordering SDU COUNT number to a next-expected SDU COUNT number.

16. An user equipment (UE), comprising:
a processor, executing instructions to perform the following:
receiving one or more PDCP protocol data units (PDUs) from lower layers;
performing a timer-based PDCP reordering process upon detecting a PDCP gap existing condition, wherein the PDCP gap existing condition indicates a sequence numbers (SN) gap between the PDCP service data units (SDUs) of two parallel radio link control (RLC) entities at a reception buffer of the UE is larger than zero; and
delivering a set of PDCP SDUs, each with a COUNT number representing a sequence number of the SDU, to upper layers based on one or more delivery criteria upon detecting one or more delivery triggering events.

17. The UE of claim 16, wherein the PDCP gap existing condition is detected when a last-delivered SDU COUNT number plus one is smaller than a next-expected SDU COUNT number.

18. The UE of claim 17, wherein the processor is further configured to start a reordering timer when detecting the PDCP gap existing condition and detecting no reordering timer running.

19. The UE of claim 18, wherein the processor is further configured to:
store corresponding received SDUs; and
set the next-expected SDU COUNT number to be equal to the largest SDU COUNT number receive plus one.

20. The UE of claim 19, wherein the processor is further configured to set a reordering SDU COUNT number to be equal to the next-expected SDU COUNT number, wherein the reordering SDU COUNT number is associated with the reordering timer.

21. The UE of claim 17, wherein the processor is further configured to stop and reset a running reordering timer upon detecting a PDCP gap-closing condition.

22. The UE of claim 21, wherein the PDCP gap-closing condition is detected when a reordering SDU COUNT number associated with the running reordering timer is smaller than or equal to the last-delivered SDU COUNT number plus one.

23. The UE of claim 16, wherein the delivery triggering event is the received SDU COUNT number equals to a last-submitted SDU COUNT number.

24. The UE of claim 23, wherein the delivered set of SDUs includes all stored PDCP SDUs with consecutively associated COUNT numbers starting from the received SDU COUNT number.

25. The UE of claim 24, wherein the processor is further configured to set the last-submitted SDU COUNT number to the COUNT number of last PDCP SDU delivered to upper layers.

26. The UE of claim 16, wherein the processor is further configured to start a reordering timer during the reordering process, wherein the delivery triggering event is an expiration of the reordering timer.

27. The UE of claim 26, wherein the delivered set of SDUs includes all stored PDCP SDUs with associated COUNT numbers less than a reordering SDU COUNT number, wherein the reordering SDU COUNT number is associated with the reordering timer.

28. The UE of claim 27, wherein the processor is further configured to set a last-submitted SDU COUNT number to the COUNT number of last PDCP SDU delivered to upper layers.

29. The UE of claim 28, wherein the processor is further configured to start a reordering timer upon detecting one or more stored SDU after the delivery of the set of SDUs, and set a reordering SDU COUNT number to a next-expected SDU COUNT number.

* * * * *